United States Patent [19]
Gonzalez-Lopez et al.

[11] Patent Number: 5,303,340
[45] Date of Patent: Apr. 12, 1994

[54] CONCAVE POLYGON DRAWING METHOD AND PROCESSOR FOR A COMPUTER GRAPHICS DISPLAY SYSTEM

[75] Inventors: Jorge Gonzalez-Lopez, Red Hook; Robert S. Horton, Hurley; Thomas P. Lanzoni, Lake Katrine; William L. Luken, Jr., Ulster Park, all of N.Y.

[73] Assignee: International Business Machines Corporation, Armonk, N.Y.

[21] Appl. No.: 18,338

[22] Filed: Feb. 16, 1993

Related U.S. Application Data

[63] Continuation of Ser. No. 425,888, Oct. 23, 1989.

[51] Int. Cl.$^5$ .............................................. G06F 15/62
[52] U.S. Cl. .................................... 395/141; 395/129; 395/134; 345/24
[58] Field of Search ................ 364/518, 521; 395/129, 395/134, 141; 340/747; 345/24

[56] References Cited

U.S. PATENT DOCUMENTS

| | | | |
|---|---|---|---|
| 4,805,116 | 2/1989 | Liang et al. | 364/521 |
| 4,815,009 | 3/1989 | Blatin | 365/518 |
| 4,819,185 | 4/1989 | Corona et al. | 364/518 |
| 4,901,251 | 2/1990 | Sfarti | 364/518 |
| 4,914,729 | 4/1990 | Omori et al. | 340/747 X |
| 4,979,130 | 12/1990 | Li et al. | 364/518 |

OTHER PUBLICATIONS

D. Field, Incremental Linear Interpolation, ACM Transactions on Graphics, vol. 4, No. 1, Jan. 1985, pp. 001–011.
Foley and Van Dam, Fundamentals of Interactive Computer Graphics, pp. 575–591, pp. 450–460.
M. R. Garey et al. "Triangulating a simple polygon,", Information Processing Letters, vol. 7, No. 4, pp. 175–179, Jun. 1978.
B. Wordenweber, "Surface Triangulation for Picture Production", IEEE CG&A, pp. 45–51, Nov. 1983.
R. E. Tarjan and C. J. Van Wyk, "A linear-time algorithm for triangulating simple polygons", Proc. 18th Annual ACM Symposium on Theory of Computing, pp. 380–388 1986.

*Primary Examiner*—Mark K. Zimmerman
*Attorney, Agent, or Firm*—Mark S. Walker; William A. Kinnaman, Jr.

[57] ABSTRACT

In a computer graphics display system, a method and processor are disclosed for drawing one of a concave polygon, self-intersecting polygon and polygon with polygonal hole. Pursuant to the method, a mask buffer organized into an M×N plurality of addressable constituent pixels is used. The method includes the steps of: masking the pixels of the mask buffer corresponding to the boundary of the polygon and drawing the pixels in the frame buffer of the display system corresponding to the boundary of the polygon; masking the pixels in the mask buffer corresponding to the interior of the polygon while preserving the masked pixels in the mask buffer corresponding to the polygon boundary; and drawing the pixels in the frame buffer corresponding to the interior of the polygon with reference to the masked polygon interior pixels in the mask buffer. Further processing steps include: tessellating the polygon into a set of triangles; determining the orientation of each of the triangles definitive of the decomposed polygon; and processing the pixels in the mask buffer corresponding to the interior of each triangle such that interior pixels of adjacent triangles of the same orientation are masked while interior pixels of adjacent triangles of different orientation are unmasked within the triangles' region of overlap. Specific algorithms are described for the above masking and drawing steps. In addition, a display processor implementing the described method is also provided.

25 Claims, 18 Drawing Sheets

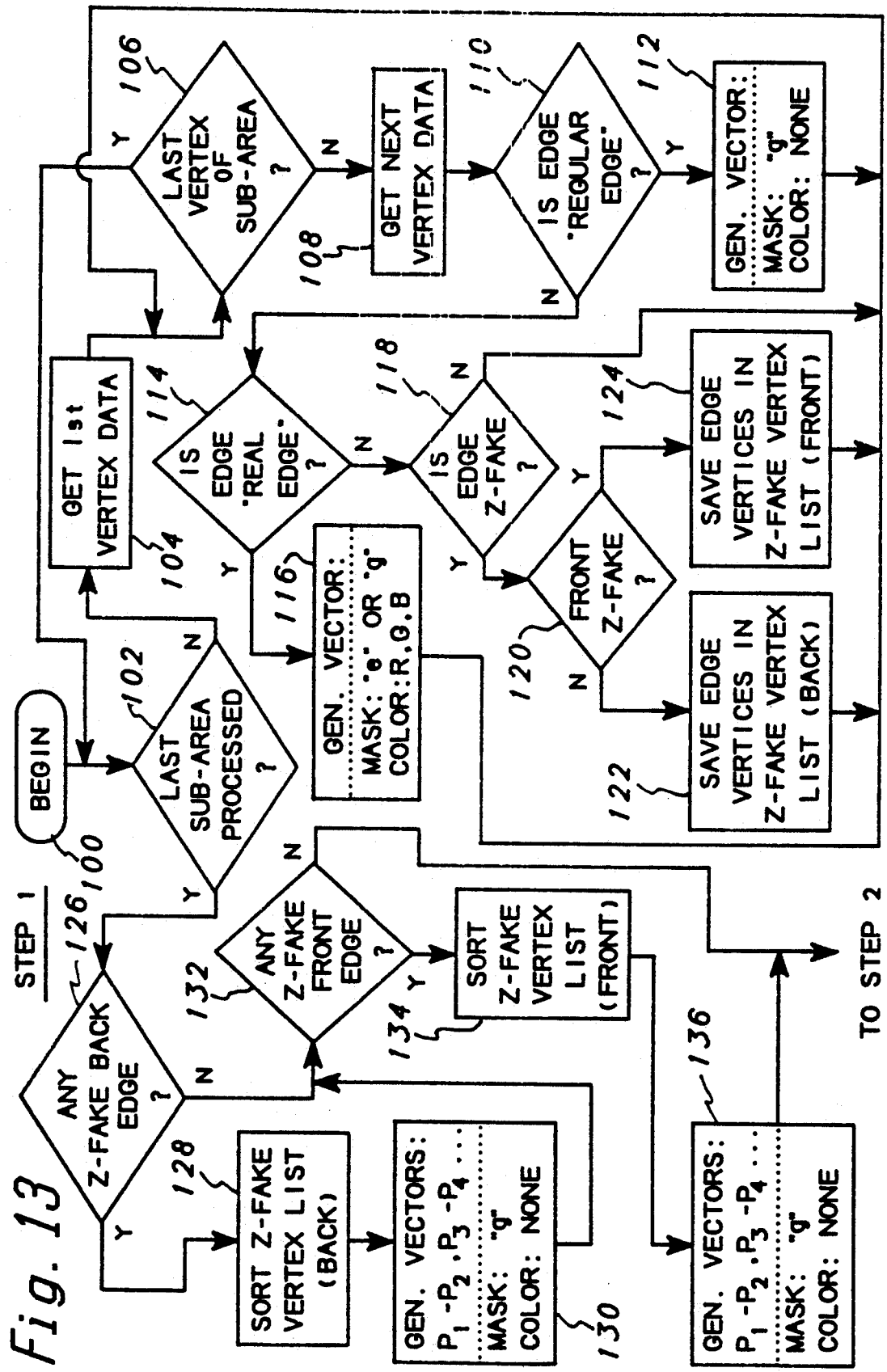

CONCAVE POLYGON DRAWING METHOD AND PROCESSOR FOR A COMPUTER GRAPHICS DISPLAY SYSTEM

This is a continuation of application Ser. No. 07/425,888 filed Oct. 23, 1989.

BACKGROUND OF THE INVENTION

1. Technical Field

This invention relates in general to computer graphics display systems, and more particularly, to an improved method and processor for drawing one of a concave polygon, self-intersecting polygon and polygon with polygonal hole, to a graphics display means including a frame buffer for storing individual pixels for each of a plurality of lines to be displayed on a display monitor.

2. Description of the Prior Art

As is well known, computer graphics display systems are computer systems which generate and display graphic images on a raster scan display device. Such graphic images are derived from digital data stored in the system's memory. The data is typically stored in the form of points in a two or three-dimensional coordinate system, wherein the points correspond to the vertices of polygons, such as triangles. The polygons form the "building blocks" of larger objects which are the ultimate display objects. Also stored with the vertex data are parametric values, i.e., intensity, or other values that permit computation of intensity such as surface color, surface reflectivity, transparency, light sources, and normal vectors.

For a given object, this data is stored in the form of a list of instructions, called a "display list". To convert such a display list to an actual image on a raster scan display, a display processor is provided which reads the list from memory, processes the data and then writes raw pixel data to the frame buffer. In raster scan real time the frame buffer is read, and the resulting data stream is converted to an analog video signal which is sent to the display device.

The present invention relates to the functions provided in the display processor portion of such computer graphics systems. Specifically, the invention relates to the generation of data relating to a third parametric value for all pixel values of a displayed triangle, based on the position of the pixels and on other data relating to the third parameter. For example, in the so-called shading problem, shading information for a given triangle may be provided to the display processor in the form of light intensity of the vertices of the triangle. Alternatively, the display processor may be provided the parameters of the object surface, the surface orientation, and the specified light model. The display processor must then, for each pixel associated with the triangle, compute a light intensity value based on the values provided.

A special case of the shading problem exists where the polygon to be shaded comprises a concave polygon, a self-intersecting polygon or a polygon with a polygonal hole (collectively referred to herein as "concave polygons"). The problem of concave polygon shading has been treated in two principal ways, namely: (1) decomposition of the polygon into convex pieces; and (2) use of a scan-line algorithm.

In the first approach, each convex piece definitive of the decomposed polygon is shaded independently. This technique is described in "Triangulating a Simple Polygon," by M.R. Garey et al., Information Processing letters, (June 1978), pp. 175–179. Another example is described in "Surface Triangulation for Picture Production," by B. Wordenweber, IEEE CG&A (November, 1983), pp. 45–51. The major disadvantage of this technique is the reduced system performance experienced due to an increase in processing time, especially when no additional vertices are introduced during the decomposition procedure. If the generation of additional vertices is allowed, a linear-time behavior for the number of vertices can be obtained. However, the process is still time consuming. An example of this alternative approach is discussed in "A Linear-Time Algorithm for Triangulating Simple Polygons," by R.E. Tarjan and C.J. Van Wyk, PROC Eighteenth Annual ACM Symposium on Theory of Computing (1986) pp. 380–388. Also, the introduction of additional vertices should be avoided if the edge of the original polygon is split into two or more pieces. Because of round-off errors, the line equation of the pieces can differ from the equation of the original edge. This can cause problems on the visibility of a line coincidence with the original polygon edge if the application chose to draw it.

The second approach to shading concave polygons, use of a scan line algorithm, is explained in *Fundamentals of Interactive Computer Graphics* by J.D. Foley and A. Van Dam, at pp. 456–460 (1985). The principle disadvantage of this approach is the additional processing required in sorting of the edge list, and the computation of the slopes (dZ/dX,dR/dX,dG/dX,dB/dX) for each span of the polygon being shaded.

The present invention is designed to solve the described performance problems associated with prior art concave polygon processing approaches and provides a drawing (i.e., filling or shading) technique for concave polygons which advantageously uses much of the hardware already standard for processing convex polygons.

SUMMARY OF THE INVENTION

Briefly described, in a computer graphics display system having a display processor and display means including a frame buffer for storing individual pixels for each of a plurality of lines to be displayed on a display monitor, this invention presents in one broad aspect a method for drawing a concave polygon in the frame buffer. The frame buffer is typically organized into an $M \times N$ plurality of addressable constituent blocks of pixels and the method uses a mask buffer similarly organized into an $M \times N$ plurality of addressable constituent pixels. The method comprises the steps of: mapping the pixels in the mask buffer corresponding to the boundary of the polygon and drawing the pixels in the frame buffer corresponding to the boundary of the polygon; masking the pixels in the mask buffer corresponding to the interior of the polygon while preserving the masked pixels in the mask buffer corresponding to the polygon boundary; and drawing the pixels in the frame buffer corresponding to the interior of the polygon with reference to the masked polygon interior pixels in the mask buffer.

In a more specific embodiment, the display processor includes a depth buffer, which is organized into an $M \times N$ plurality of addressable constituent blocks of pixels, for storing Z values of individual pixels. The method further includes the steps of: storing in the depth buffer appropriate Z values at pixels corresponding to the boundary of the polygon; and storing Z values in the depth buffer at pixels corresponding to the interior of the said polygon with reference to the masked polygon interior pixels in the mask buffer.

In addition, the method preferably includes: tessellating the polygon into a set of triangles; determining the orientation of each of the triangles definitive of the decomposed polygon; and processing the pixels in the mask buffer corresponding to the interior of each triangle such that interior pixels of adjacent triangles of the same orientation are masked while interior pixels of adjacent triangles of different orientation are unmasked within the triangles' region of overlap. Specific algorithms for implementing the outlined masking, drawing and storing steps are provided.

In another embodiment, the invention comprises a display processor which implements the above described method. The processor includes: a controller; edge/triangle generation means connected to receive signals from the controller; first combinational logic means connected to receive signals from the generation means; a mask buffer organized into an $M \times N$ plurality of constituent pixels, the mask buffer being connected to receive pixel values from the first combinational logic means and address signals from the generation means; the pixel values from the first combinational logic means and address signals from the generation means being uses by the processor to form in the mask buffer the mask of the boundary of the polygon and the interior of the polygon; and second combinational logic means connected to receive address signals from the generation means and pixel values from the mask buffer. In response to the signals and pixel values input, second combinational logic means produces one of an edge signal and a fill signal for each X,Y address processed. An edge signal corresponds to a boundary pixel of the polygon and a fill signal corresponds to an interior pixel of the polygon. The signals are sent to the frame buffer.

The present invention significantly reduces concave polygon processing time in comparison with prior art techniques. Further, and as is apparent from the detailed description presented below, the invention is implemented using many elements of existing display system hardware, for example, elements needed to process convex polygons.

BRIEF DESCRIPTION OF THE DRAWINGS

These and other objects, advantages and features of the present invention will be more readily understood from the following detailed description of certain embodiments of the present invention, when considered in conjunction with the accompanying drawings in which:

FIG. 13 is a flow diagram representation of a first processing step of the present invention;

DETAILED DESCRIPTION OF THE INVENTION

As briefly stated above, this invention presents an improved method and processor for drawing (i.e., filling or shading) a polygon given its coordinates and their corresponding intensities (i.e., principally color, e.g., using a red, green, and blue color system (RGB)) at its vertices. The invention is specifically directed to processing concave polygons. Unless otherwise specified, the term "concave polygons" is used herein to include self-intersecting polygons and polygons with polygonal holes. In all embodiments hereof, the boundary and interior colors of the polygon can be different. Further, in an enhanced embodiment, the line describing the polygon boundary can be styled, for example, dotted, dashed, etc.

Figure 1:
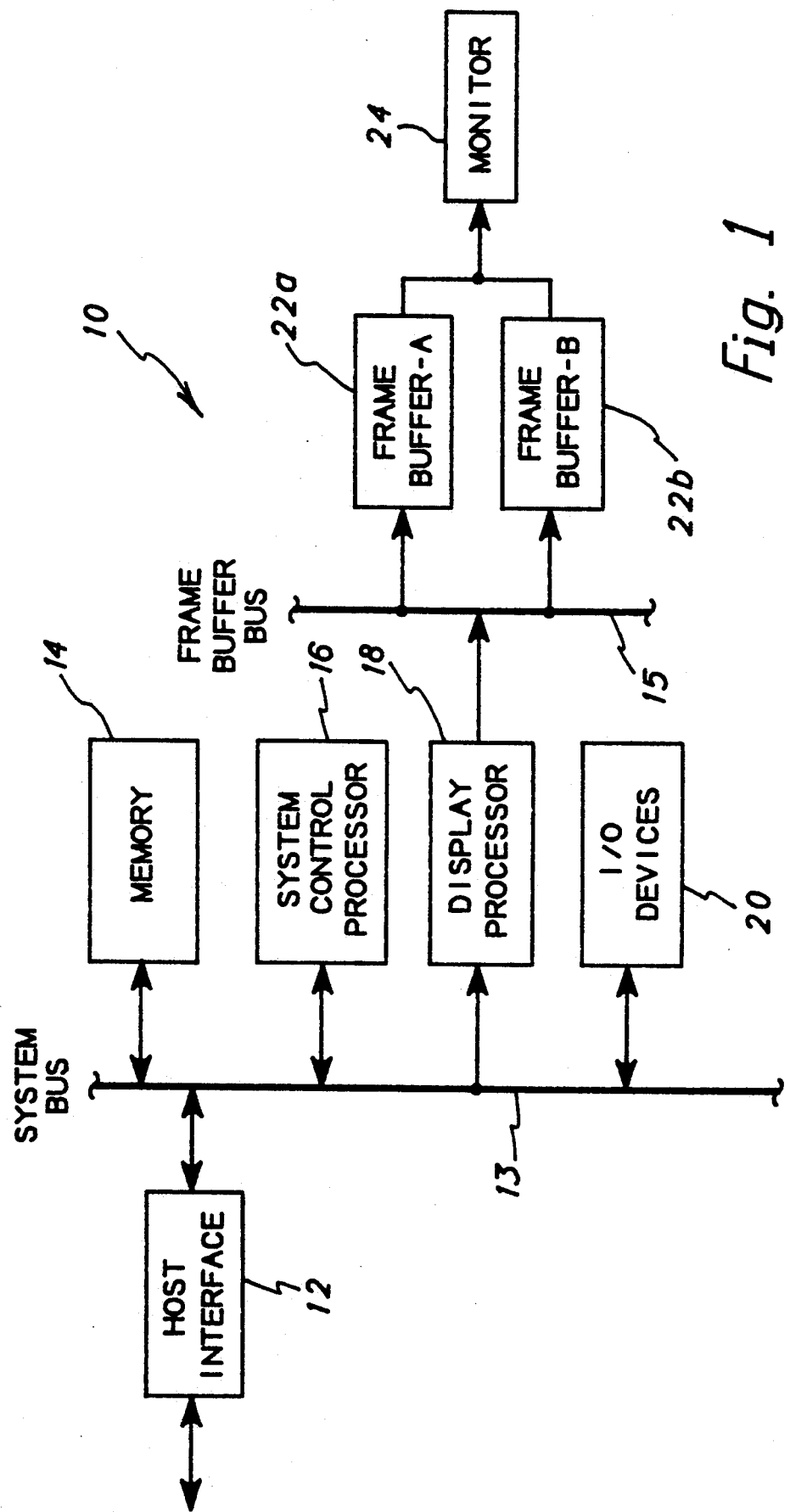
FIG. 1 is a general block diagram representation of a computer graphics display system incorporating the present invention.

Referring first to FIG. 1, several major components of a raster graphics display system, generally denoted 10, are illustrated. System 10 includes host interface 12, system memory 14, system control processor 16, display processor 18, input/output devices 20, two frame buffers 22a & 22b and monitor 24. Each of these components can be implemented by elements of commercially available computer graphics display systems such as the IBM 5080. Briefly described, memory 14, processors 16 & 18 and I/O devices 20 communicate with each other through a system bus 13 and with a host computer (not shown) through serial host interface 12. System control processor 16 is a general purpose processor that has master control of graphics system 10. Processor 16 is responsible for servicing all attached graphics input/output devices 20, coordinating the associated processing with display processor 18 and interfacing with the host computer via interface 12. Display processor 18 is responsible for executing graphics orders in a display program residing in system memory 14 and is concerned primarily with the generation of the image that will appear on display monitor 24. Display processor 18 functions in part to prepare geometric primitives, such as polygons and polylines, representative of an object to be displayed on monitor 24. The display processor reads basic primitives from memory 14 through system bus 13, interprets them and generates the desired picture elements in frame buffer-A 22a and frame buffer-B 22b by a frame buffer bus 15. The frame buffers are usually dual, which allows for one buffer to be written by the drawing processor while the other is displayed by the monitor. The methods and systems comprising the present invention are principally implemented within display processor 18 of system 10.

Figure 2:
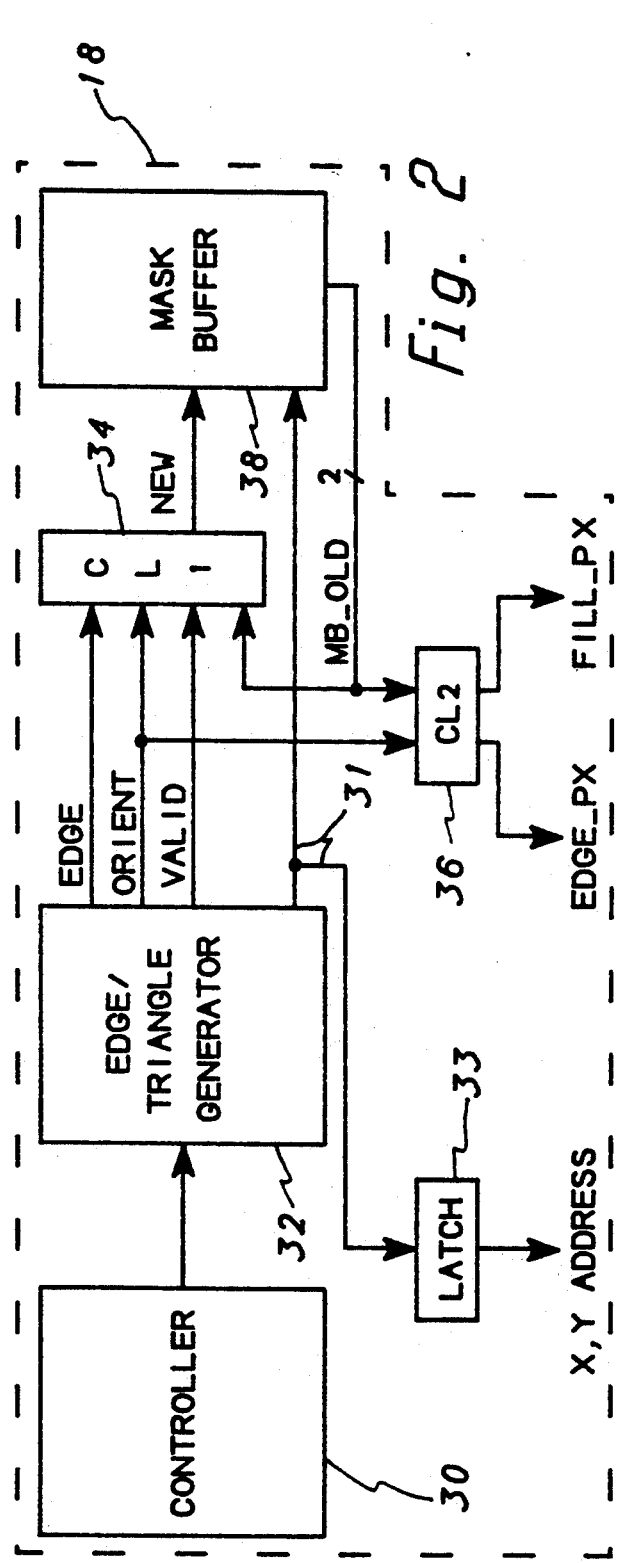
FIG. 2 is a block diagram representation of one embodiment of the display processor of the present invention.

A first, basic embodiment of the invention, configured for filling a polygon using a standard hardwired triangle generator, is depicted in FIG. 2. (As used in connection with this embodiment, definition of the term "concave polygons" is deemed to omit polygons with polygonal holes.) The advantage of this embodiment is that it makes use of the same triangle generator used in polygon shading (described below) and, therefore, both the shading and filling functions can be integrated in the same piece of hardware. As shown, processor 18 includes controller 30, edge/triangle generator 32, first combinational logic circuit 34, second combinational logic circuit 36, and mask buffer 38. Controller 30 is a microprocessor that reads and interprets the order list stored in system memory and computes the geometrical transformations as well as other operations like clipping, lighting and depth-cueing. Edge/triangle generator 32 functions either as an edge generator or as a triangle generator depending upon the mode of operation set by controller 30. Three operation signals are output from generator 32, namely, "VALID" which indicates that the present signal comprises a valid pixel of the polygon (either in edge or triangle generation mode), "ORIENT" which signals the orientation of a triangle partially definitive of the polygon (see discussion below), and "EDGE" which goes active when generator 32 is in edge generation mode. In edge generation mode, generator 32 generates the sequence of addresses of the points of a vector connecting two vertices of a polygon. In this mode, signal VALID indicates that address line 31 contains an actual address of an edge pixel. Also, signal EDGE is active and signal ORIENT is inactive in edge generation mode.

In triangle generation mode, generator 32 receives X and Y coordinates of the vertices of a triangle and generates a sequence of addresses of the pixels definitive of the triangle. (Where the vertices of a polygon having four or more sides are to be processed, the vertices are commonly processed in the open art in combinations of three at a time in a methodical sequence so that the system is processing simple triangles rather than complex polygons.) In triangle generation mode, signal VALID indicates that address line 31 contains the actual address of a triangle pixel. Signal EDGE goes inactive when in triangle generation mode and signal ORIENT indicates the orientation of the current triangle. The ORIENT signal is defined as follows:

$$\text{ORIENT} = \text{'+'} \text{ if } ViVj \times ViVk \geq 0 \quad (1)$$

$$\text{ORIENT} = \text{'-'} \text{ if } ViVj \times ViVk < 0 \quad (2)$$

ViVj is the vector from vertex Vi to vertex is the vector from vertex Vi to Vk and 'x' is the cross product operation. ORIENT is constant for a given triangle.

As noted, controller 30 interprets the polygon fill command order in an order list stored in system memory and feeds triangle generator 32 with the X and Y coordinates of the vertices of the polygon. If P1, P2, ..., PN are the vertices of an N-sided polygon, controller 30 instructs generator 32 to draw the edges of the polygon (P1−p2, p2−p3, ..., P(N−1)−PN, PN−P1) when in edge mode. When in triangle mode, controller 30 tessellates the polygon into a set of triangles as follows: the first triangle is given by P1, P2, and P3; the second, by P1, P3, and P4; The last by P1, PN−1, and PN. Controller 30 loads generator 32 with appropriate vertex data on a triangle-by-triangle basis.

Mask buffer 38 comprises a buffer memory organized as $M \times N$ locations, each two bits deep. The $M \times N$ locations are selected to correspond to a typical screen monitor size of $M \times N$. With two bit planes, each X,Y location can store one of four signals. The signals are labeled in this description: '+', '−', 'e', and '0'. Buffer 38 is updated by combinational logic circuit 34, with each X,Y address being received via line 31 from generator 32.

Combinational logic circuit 36 outputs signals "EDGE_PX" and "FILL_PX" to system frame buffers 22a & 22b. An EDGE_PX signal active indicates that the current point is an edge point. The X,Y address (via line 31) corresponding to this edge point is written in the frame buffers with an edge color. A signal FILL_PX active indicates that the corresponding location given by X,Y address on line 31 must be filled in the frame buffers with an interior color. Signals on the address line to the frame buffers are preferably delayed to account for access time to the mask buffer. This can be readily accomplished in the art, for example, by use of a latch circuit 33.

For each polygon to be filled, the present method requires three passes through the X,Y coordinates and intensities representative of the polygon. Initially, however, mask buffer 38 is cleared, i.e., each pixel of the buffer is set to a value '0' before proceeding to process the first polygon. In a first pass, triangle generator 32 operates in edge generation mode to mask the edges of the polygon in mask buffer 38 by: (1) generating the address sequence of the points of each polygon edge; (2) writing the value 'e' in mask buffer 38 at those locations corresponding to VALID edge addresses. In a second pass, for each triangle of the tessellated polygon, generator 32 masks pixels in buffer 38 corresponding to the interior of the polygon by: (1) generating the address sequence of the points of the triangle; and (2) loading mask buffer 38 at each valid address with a new buffer value according to Table 1.

TABLE 1

| ORIENT | MB_OLD | MB_NEW |
|---|---|---|
| '+' | '+' | '+' |
| '+' | '−' | '0' |
| '+' | '0' | '+' |
| '+' | 'e' | 'e' |
| '−' | '+' | '0' |
| '−' | '−' | '−' |
| '−' | '0' | '−' |
| '−' | 'e' | 'e' |

Truth Table 1, which resides within first combinational logic circuit 34, can be readily implemented by those skilled in the art.

In a third pass through the data structure, for each triangle representative of the polygon, the triangle generator: (1) generates the address sequence of the points of the triangle; (2) asserts signal EDGE_PX if address X,Y is valid and the content of mask buffer 38 at that location is 'e'; (3) activates FILL_PX if address X,Y is valid and the content of mask buffer 38 at that location is a '+' or '−'; and (4) reinitializes mask buffer 38 if address X,Y is VALID. Logic for assertion of the EDGE_PX and FILL_PX signals is implemented in circuit 36. Reinitialization of mask buffer 38 occurs through first combinational logic circuit 34.

Figure 3:
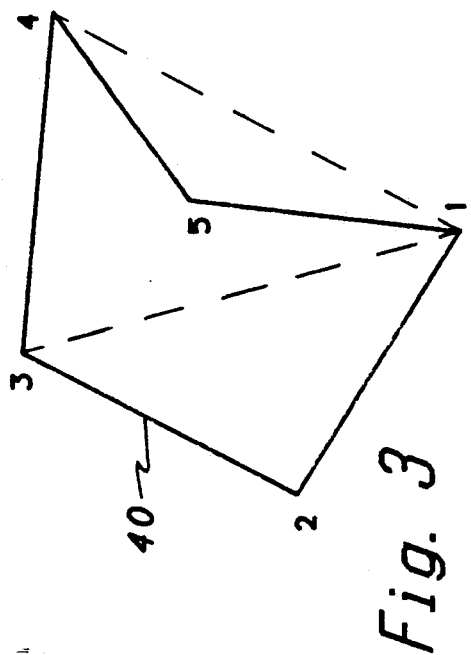
FIG. 3 depicts a concave polygon to be processed according to the present invention.
Figure 4C:
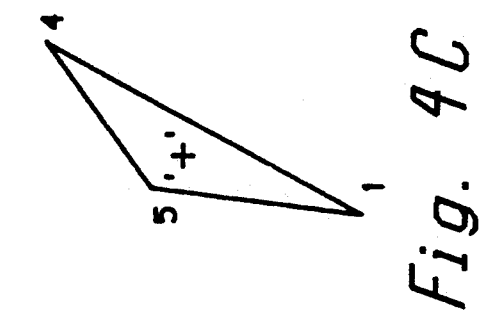
FIGS. 4A-4C depict the concave polygon of FIG. 3 tessellated into three triangles, and the respective orientations of the triangles.
Figure 4B:
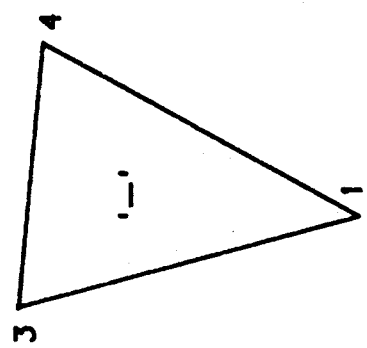
Figure 4A:
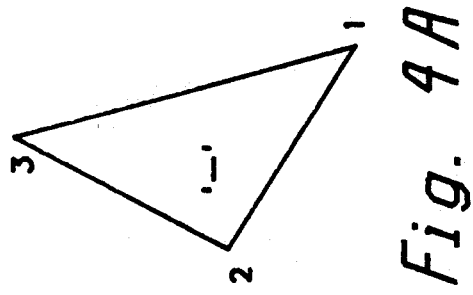
Figure 5C:
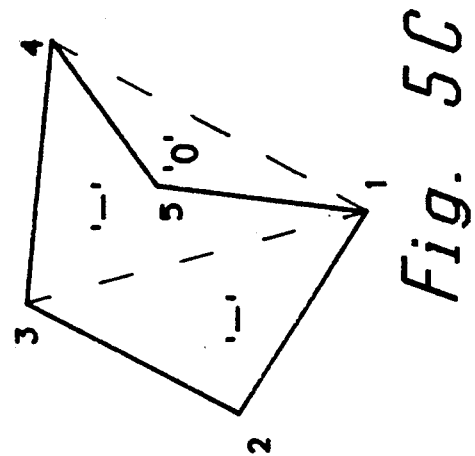
FIGS. 5A-5C graphically depict the summation method of the present invention for processing adjacent triangles.
Figure 5B:
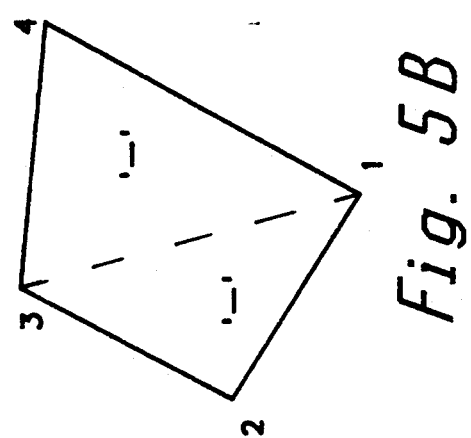
Figure 5A:
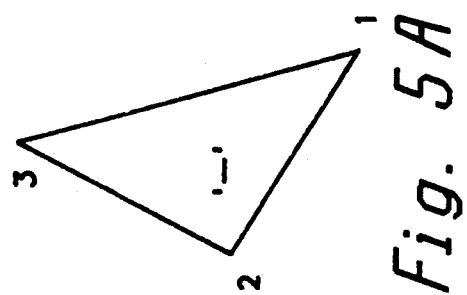

An example of a concave polygon 40 is depicted in FIG. 3, wherein polygon 40 is defined by vertices P1, P2, P3, P4, P5. The resulting triangles formed by tessellation of polygon 40 are depicted in FIGS. 4A-4C as well as their respective corresponding values of ORIENT. FIGS. 5A-5C illustrate the content of mask buffer 38 after generator 32 has processed each triangle P1P2P3, P1P3P4 and P1P4P5 in the second pass of the described processing.

Figure 6:
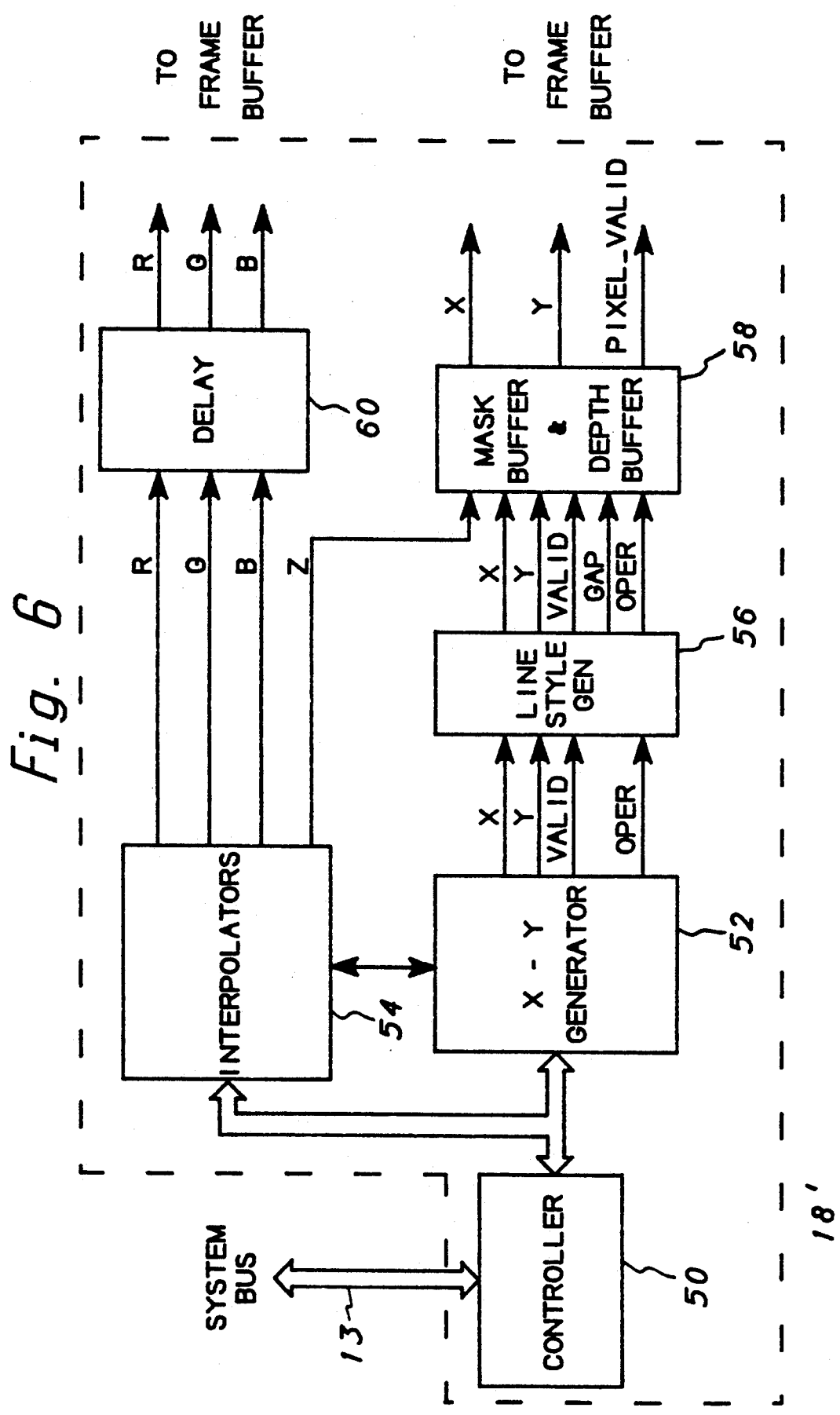
FIG. 6 is a block diagram representation of an alternate embodiment of the display processor of the present invention.
Figure 7:
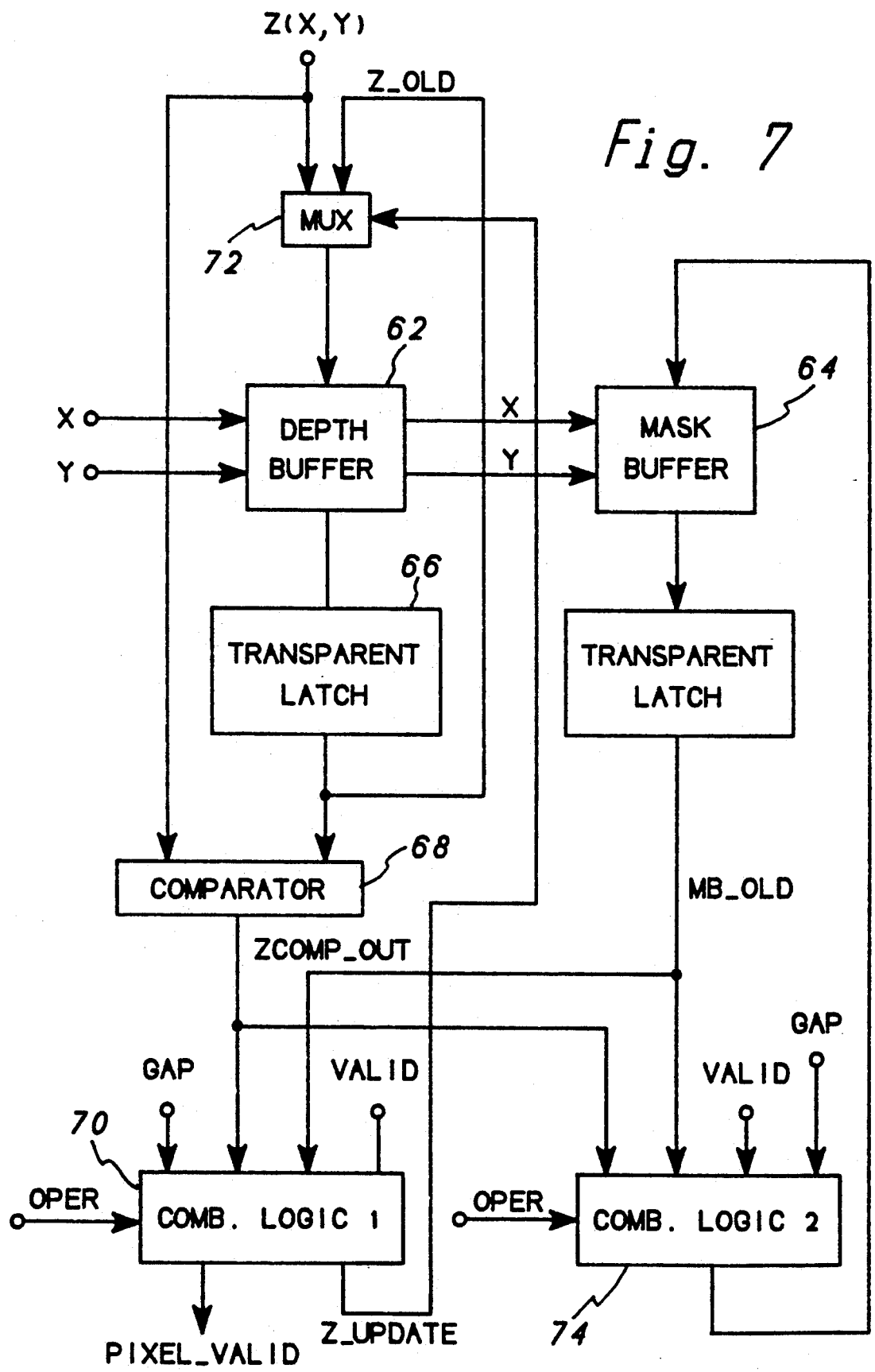
FIG. 7 is a block diagram representation of the mask & depth buffer unit depicted in FIG. 6.

An alternative, enhanced embodiment of this invention is depicted in FIGS. 6 & 7. In this embodiment, a display processor 18' operates to shade polygons given the coordinates and intensities at its vertices. Also, the boundary of the polygon can be styled, for example, dotted, dashed etc. This embodiment operates best when the interpolating functions can be described by a plane. Also, a geometric primitive to be processed may consist of several sub-polygons or sub-areas under a single polygon command. All sub-areas grouped under a single command are processed together on a triangle-by-triangle basis pursuant to the present invention.

Referring now to FIG. 6, display processor 18' communicates with the display system through system bus 13. Processor 18' includes controller 50, X-Y generator 52, interpolators 54, line style generator 56, mask & depth buffers and their associated combinational logic circuits, 58, and delay circuitry 60. With the exception of the mask buffer and its supporting logic in unit 58, each of these components can consist of commercially available elements of computer graphics display systems. As with controller 30 of the embodiment depicted in FIG. 2, controller 50 comprises a microprocessor that reads and interprets the order list stored in system memory and computes the required geometrical transformations as well as other operations such as clipping, lighting, and depth-cueing. As part of the order list, boundary flags associated with each vertex are typically given. For example, a first flag may define a "real edge" comprising a solid or styled edge of the polygon boundary; a second flag may signal that a boundary edge (referred to below as a "regular edge") is to receive an interior color; and, a third flag may define a fake Z front edge or a fake Z back edge generated from clipping the polygon against a front or back Z-axis clipping plane, respectively. (Fake X and Fake Y edges are identified in the clipping process as "regular edges.") These flags are advantageously used by some aspects of the processing discussed in detail below.

Controller 50 communicates with the rendering pipeline composed of X-Y generator 52, interpolators 54, line style generator 56, and logic circuitry of mask buffer and depth buffer unit 58. For each polygon primitive, and each vertex thereof, the positions (X,Y,Z), interior colors (e.g., R,G,B) and edge colors (R,G,B) are made available to the rendering pipeline.

Generator 52 generates a sequence of X and Y coordinates corresponding to two possible modes of operation: (1) vector generation mode; and (2) triangle generation mode. In vector generation mode, generator 52 implements a vector generation algorithm, such as the well known Bresenham's algorithm, given the coordinates of two end points of the vector. The algorithm provides a sequence of X,Y coordinates in screen space that best approximates a geometrical straight line. The first and last generated points, i.e., the end points, always lie on the geometrical line. Intermediate points, however, may be on the geometrical line or not depending on the particular line that the two end points define. As explained further below, the vector generator preferably implemented in this invention detects which points of the generated sequence lie exactly on the geometrical line, which allows for two "sub-modes" of operation under direction of controller 50: (1) normal generation mode; and (2) on-geometrical-line generation mode. The later of these generates just the points that lie exactly on the geometrical line.

In triangle generation mode, X-Y generator 52 can, for example, be configured by those skilled in the art to generate all points that are internal or exactly on the edge of the triangle defined by the three given vertices (and thus the need for the on-geometrical-line vector generation sub-mode in the processing described below). Alternatively, the process could be implemented with a more typical, less precise triangle generation approach as long as in vector generation mode the points corresponding to the triangle edges are capable of being generated (explained further below).

In triangle generation mode, generator 52 computes the binary variable ORIENT, which, again, indicates the orientation of the triangle and is defined by equations (1) & (2). The value of ORIENT is made available to controller 50 through, for example, an appropriate status register in X-Y generator 52. X-Y generator 52 provides control signals to interpolators 54 as well as a pixel validation signal (VALID) to line style generator 56. Signal OPER, output from generator 52 and controlled by controller 50, distributes control information to the different pieces of logic in the rendering pipeline, such as line style selection activation, control of the depth buffer, etc.

Interpolators 54 also have two operating modes: vector mode and triangle mode. Interpolators 54 generate in a well known manner interpolated values of Z and R,G & B (the color primaries) for points of a vector (if in vector generation mode) from the corresponding values at the end points, or interpolated values of the points of the triangle (if in triangle generation mode) from the corresponding values at the vertices. In vector mode, interpolators 54 may implement a method such as that described in an article entitled, "Incremental Linear Interpolation," by D. Field, ACM Transactions on Graphics, Volume 4, No. 1, (January 1985). In triangle mode, a method such as that disclosed by Liang and Gonzalez in U.S. Pat. No. 4,805,116 entitled, "Interpolated Display Characteristic Value Generator," is suitable. In both modes interpolators 54 work under X-Y generator 52 control and in synchronism with the generator such that X, Y, Z, R, G, & B values of each interpolated point are available to the frame buffers simultaneously. This is accomplished in part by R,G,B delay circuit 60.

Line style generator 56 operates when X-Y generator 52 is in vector generation mode. Generator 56 produces the signal "GAP" to indicate that the current pixel belongs to an active segment of the line or to a gap between segments, i.e., assuming stylized lines are present. Suitable implementations of line style generator 56 are available in the open literature.

Mask buffer & depth buffer unit 58 implements the well known Z buffer algorithm in a depth buffer in combination with a mask buffer to allow for the shading of concave polygons. This combination, which enhances the operation of the Z-buffer, is a central aspect of this invention. The depth buffer is an M×N memory, usually 16 to 32 bits deep, within which Z(X,Y) values are stored in a way similar to the Z buffer algorithm. M & N are typically screen dimensions. The mask buffer is also a memory of the same size as the depth buffer but, for example, only two bits deep. Both buffers are addressed by the X & Y coordinates output from X-Y generator 52.

A more detailed depiction of mask buffer and depth buffer circuit 58 is provided in FIG. 7. X,Y coordinates are fed to both depth buffer 62 and mask buffer 64 to identify the pixel location under process. The Z value at location X,Y is fed from interpolator 54 to a comparator 68 which compares the new value with the content of depth buffer 62 at location X,Y to determine if, for example, $Z(X,Y) \geq Z\_OLD$ for a right-hand coordinate system. A transparent latch 66 is used for timing purposes to delay Z_OLD. The output from comparator 68, ZCOMP_OUT, as well as signals GAP, VALID and the corresponding location X,Y of mask buffer 64 (MB_OLD) are used to generate the signals PIXEL_VALID and Z_UPDATE via a first combinational logic circuit 70. PIXEL_VALID is used to signal the frame buffer (FIG. 1) that the current pixel is valid and should be accepted. Z_UPDATE indicates that the new Z value, Z(X,Y), should replace the old content of the depth buffer at that location. The signal is fed to a multiplexer 72 for directing this election between Z(X,Y) and Z_OLD.

In a similar manner, the content (MB_OLD) of mask buffer 64 at location X,Y (via a transparent latch 65) and the signals VALID, GAP and ZCOMP_OUT are used in a second combinational logic circuit 74 to generate the mask buffer value intended to replace the content of mask buffer 64 at location X,Y. The nature of mask buffer 64 is explained further below. Signals OPER are control signals to the combinational logic circuits 70 & 74 to enable the operation of the shading algorithm and to identify its different steps (described below).

Pursuant to this embodiment of the invention, the two bit plane mask buffer 64 allows storing of one of four different values at each location. These mask values are labeled as:

'0': initial condition, cleared pixel
'i': interior pixel
'g': edge gap pixel
'e': edge segment pixel Combinational logic circuit 74 implements a logical operation (symbolized by '■' in the following algorithm description) between two input values: the content of the mask buffer (i.e., MB_OLD) and some other value as specified by the algorithm. Truth Table 2 identifies the value to be stored into mask buffer 64 to replace MB_OLD.

TABLE 2

| Input | Output | Input | Output | Input | Output |
|---|---|---|---|---|---|
| '0' | '0' | '0' | '0' | 'g' | '0' | 'g' |
| '0' | 'i' | 'i' | 'g' | 'i' | 'g' |
| '0' | 'g' | 'g' | 'g' | 'g' | 'g' |
| '0' | 'e' | 'e' | 'g' | 'e' | 'e' |

TABLE 2-continued

| Input | Output | Input | Output |
|---|---|---|---|
| 'i' | '0' | 'i' | 'e' | '0' | 'e' |
| 'i' | 'i' | '0' | 'e' | 'i' | 'e' |
| 'i' | 'g' | 'g' | 'e' | 'g' | 'e' |
| 'i' | 'e' | 'e' | 'e' | 'e' | 'e' |

With inspection of Table 2, it should be observed that the '■' operation is commutative and that the value 'e' has higher priority in that it appears at the output if the signal appears on any of the inputs. The value 'g' is similar in this respect except that the signal has less priority than 'e' (i.e., 'e' '■' 'g' = 'e'). This simply means that edge segment pixels are given priority over edge gap signals. The operation '■' is essentially an exclusive-or operation with respect to the values '0' and 'i'. As will be apparent from the following discussion, the operation '■' on mask buffer 64 is designed to preserve the polygon boundary pixels over any interior pixel and the edge segment pixels over the edge gap pixels. Any interior pixel that is written an even number of times results in a masked value of '0', which advantageously allows for the exclusion of concavities and holes in the final picture. A discussion of one implementing algorithm of this invention embodiment will now be presented.

Again, the appropriate processing steps are identified by the OPER signal from generator 52. The algorithm assumes that as preliminary conditions each pixel of the mask buffer is initialized to value '0' and each pixel of the depth buffer is initialized to a value corresponding to the farthest Z value. Each step involves a separate pass through the rendering pipeline.

Step 1: The purpose of this step is to initially mask the boundary of the polygon in the mask buffer so that it will be preserved in subsequent processing. Again, edges can be stylized. The "real edge," "regular edge" and "Z-fake edge" flags initially identify the type of boundary edge being processed. The "segment" pixels are drawn with the edge color. The edge "gap" pixels of a "real edge" are not drawn in the frame buffer and will subsequently be assigned the interior color. "Regular edge" pixels are similarly processed. X-Y generator 52 and interpolators 54 are set in vector mode to generate the polygon edges. For each pixel on the edge of the polygon, the operation of the mask buffer, depth buffer, and frame buffer depends upon the output of line style generator 56 as follows:

Line style gap pixel:
  Mask buffer:
    If ZCOMP_OUT = "true"  (e.g., $Z(X,Y) \geq$ ZB_OLD)
    Then MB < = 'g' ■ MB_OLD
  Depth buffer:
    If (ZCOMP_OUT = "true" & MB_OLD 'e')
    Then DB < = Z (X,Y)
  Frame buffer:
    No change.
Line style segment pixel:
  Mask buffer:
    If (ZCOMP_OUT = "true" or MB_OLD = 'g')
    Then MB < = 'e'
  Depth buffer:
    If (ZCOMP_OUT = "true" or MB_OLD = 'g')
    Then DB < = Z(X,Y)
  Frame buffer:
    If (ZCOMP_OUT = "true" or MB_OLD = 'g')

Then FB <= R,G,B.

Again, the ■ operation is defined in Table 2. The above algorithms are standard Boolean operations which can be carried out by those skilled in the art. Depth buffer and frame buffer processing are implemented in combinational logic circuit 70 and mask buffer processing resides in combinational logic circuit 74. From the above algorithms it can be observed that if the point under process comprises an edge gap pixel and the Z value, for example, is greater than or equal to the depth buffer value stored at X,Y, then the mask buffer is assigned a value 'g' unless the mask buffer already holds the value 'e' from previous point processing. Also note that edge segment pixels and edge gap pixels are drawn into the mask buffer, visible Z(X,Y) values are assigned to the depth buffer, and if the depth buffer indicates that Z(X,Y) is a visible edge segment pixel (i.e., ZCOMP_OUT="true") then the colors R,G,B at that point are assigned to the frame buffer.

Step 2: The purpose of this step is to mask the interior of the polygon in the mask buffer. To accomplish this, the X-Y generator and the interpolators are set to triangle generation mode. If P1, P2, ..., PN are the vertices of the polygon, and Q1, Q2, ..., QM are the vertices of a hole in the polygon (i.e., if present) then the controller instructs the X-Y generator and the interpolators to generate triangles, P1P2P3, P1P3P4, ..., P1(PN−1)PN. Similarly, if the polygon being processed contains a hole, then triangles Q1Q2Q3, Q1Q3Q4, ..., Q1(QM−1)QM are generated. As noted above, FIGS. 3 & 4A-4C provide an example of a concave polygon which has been tessellated into three triangles. Triangle 1,2,3 is generated first, then triangle 1,3,4, and, finally, triangle 1,4,5. After the first and second triangles are generated, the mask buffer contains a mask corresponding to the convex polygon 1,2,3,4 (FIG. 5B). With the last triangle generation, the region of overlap, 1,4,5, of adjacent triangles of opposite orientation is subtracted from this convex polygon by the exclusive-or function implicit in the ■ operation (FIG. 5C). Edges 1,5 and 5,4 are not subtracted because the values 'e' or 'g' used in step 1 have priority (see Table 2).

In this embodiment, special consideration must be given to points common to adjacent triangles. For example, common points along interior line 1,3 of FIG. 3 should be preserved notwithstanding the initial exclusive-or elimination of these pixels by the ■ operation. On the other hand, those pixels common to line 1,4 should not be preserved since they are outside the concave polygon. A solution to this problem is to generate the common points once more if the orientation (i.e., values of ORIENT) of two adjacent triangles are the same. This is the case with line 1,3 but not with line 1,4. Because, as noted above, the X-Y generator operating in triangle generation mode preferably produces only points interior to the geometric triangle or exactly on his boundary, it follows that the common points must be those of the geometrical (true straight line) having integral X and Y coordinates. To accomplish this, the controller instructs the X-Y generator to generate common points in vector mode, on-geometrical-line sub-mode (discussed below) for adjacent triangles of the same orientation.

In both cases of this step, triangle generation mode and vector generation mode, the operation of mask buffer, depth buffer, and frame buffer are:

Mask buffer:
 MB <= 'i' ■ MB_OLD.
Depth buffer:
 No change.
Frame buffer:
 No change.

Note that Z, R, G, and B values are not required in this step since the depth buffer and frame buffer are not being written, but rather the step is only generating a correct outline of the polygon in the mask buffer.

Figure 8:
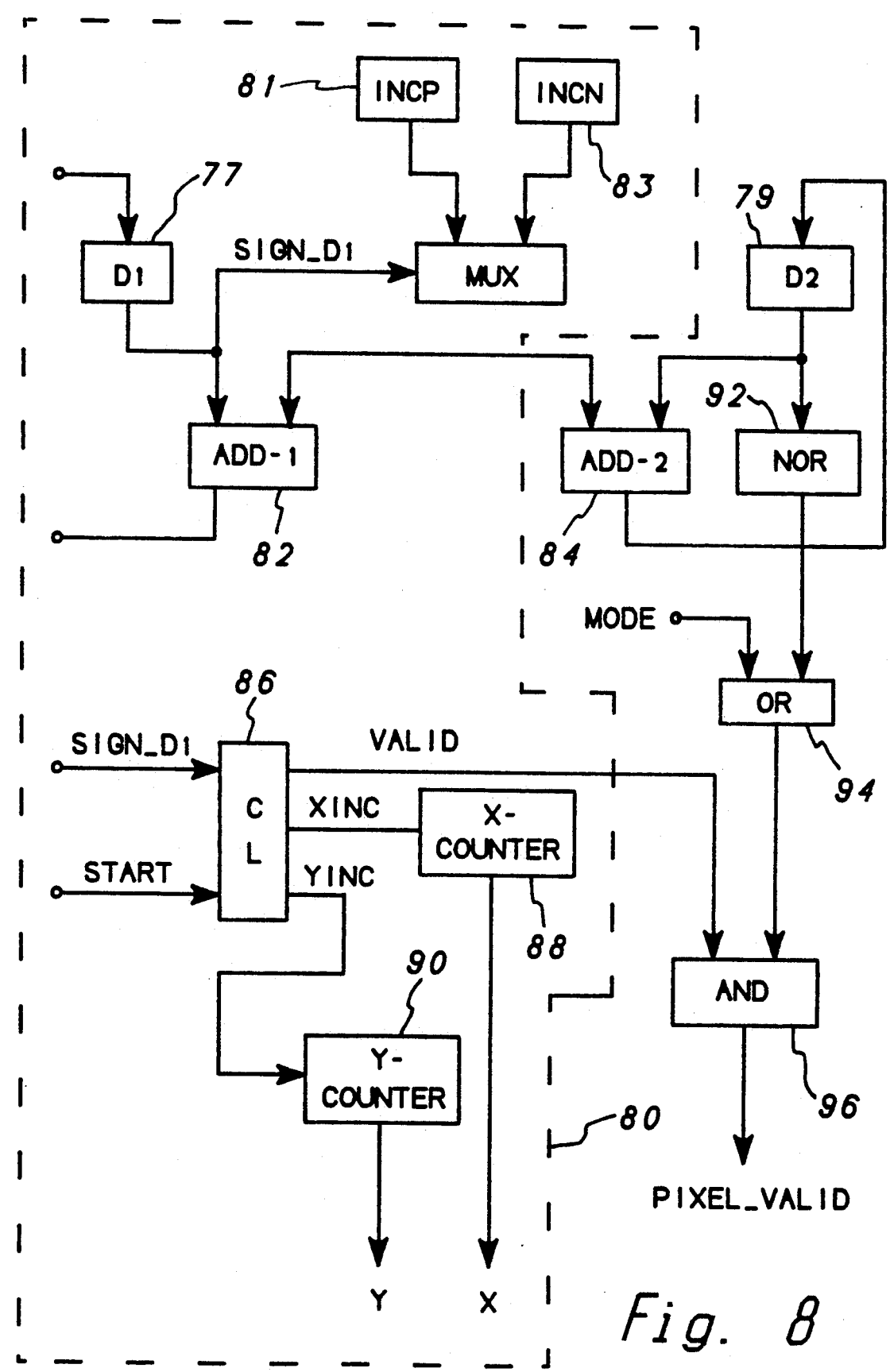
FIG. 8 is a block diagram representation of logic circuitry implementing the on-geometric-line sub-mode processing of the X-Y generator depicted in FIG. 6.

One implementation of circuitry for the on-geometric-line sub-mode is depicted in FIG. 8 and defined in Table 3. Traditionally, vector generators generate a sequence of screen coordinates (X,Y) that best approximates the geometrical straight line that connects two given end points. In the Bresenham algorithm, the positional error of each generated pixel with respect to the geometrical line is not greater than 0.5 units. The error is zero at the end points and, possibly, at some intermediate points of the generated vector. However, with the mask generation techniques used herein, only those points with zero error condition are required. FIG. 8 comprises a novel logic circuit which implements such a zero error detector. The logic within dashed line 80 is present in a conventional Bresenham's vector generator.

The following set up procedure is implemented by an external microprocessor or hardware logic to draw a vector from point P1(X1,Y1) to P2(X2,Y2).

First:
 DX & DY are computed as follows:
  DX = ABS(X2−X1)
  DY = ABS(Y2−Y1)
 wherein ABS = absolute value Second:
 The OCTANT of operation is determined by the following logical expressions:
  DX ≧ DY
  X2 ≧ X1
  Y2 ≧ Y1
 A three bit signal OCTANT is asserted with the result of these three expressions.

Third:
 Registers INCP, INCN, and D1 (FIG. 8) are loaded with values given by Table 3 as a function of the logical expressions evaluated in the first and second steps to derive the OCTANT signal.

Fourth:
 Register D2 (FIG. 8) is cleared.

Fifth:
 The X-counter and Y-counter are loaded with X1 and Y1 respectively.

Sixth:
 Signal MODE is asserted according to the mode of operation as follows:
  MODE = 0: generate "on-geometrical-line" points.
  MODE = 1: generate all points of the vector.

Note that each of the above procedures are required in the regular Bresenham algorithm except for the fourth and sixth operations.

TABLE 3

| DX≧DY | X2≧X1 | Y2≧Y1 | INCP | INCN | D1 | XINC | YINC |
|---|---|---|---|---|---|---|---|
| Yes | Yes | Yes | −2DX+2DY | +2DY | −DX | +1 | +1* |
| Yes | Yes | No | −2DX+2DY | +2DY | −DX | +1 | −1* |

TABLE 3-continued

| DX≧DY | X2≧X1 | Y2≧Y1 | INCP | INCN | D1 | XINC | YINC |
|---|---|---|---|---|---|---|---|
| Yes | No | Yes | −2DX+2DY | +2DY | −DX-1 | −1 | +1* |
| Yes | No | No | −2DX+2DY | +2DY | −DX-1 | −1 | −1* |
| No | Yes | Yes | −2DY+2DX | +2DX | −DY | +1* | +1 |
| No | Yes | No | −2DY+2DX | +2DX | −DY | +1* | −1 |
| No | No | Yes | −2DY+2DX | +2DX | −DY-1 | −1* | +1 |
| No | No | No | −2DY+2DX | +2DX | −DY-1 | −1* | −1 |

(* = Increment or decrement only if SIGN_$_{D1}$ = 0 0)

Referring to FIG. 8, in operation, if register D1≦0 (i.e., the sign bit of register D1, signal SIGN_D1=1, or negative), then value INCN 81 is added to registers D1 77 and D2 79 by adders ADD-1 82 and ADD-2 84, respectively. Otherwise, value INCP 83 is added to registers D1 77 and D2 79. A combinational logic circuit 86 increments or decrements the X-counter 88 and Y-counter 90 as a function of the sign bit of D1 (i.e., signal SIGN_D1) and signal OCTANT as shown in Table 3 (columns XINC and YINC). Note that the asterisk on an entry on the table means that the increment or decrement takes place only if SIGN_D1=0 (i.e., D1≧0). Circuit 86 asserts a VALID signal whenever a generated pixel is valid.

A D2=0 condition is detected by a NOR circuit 92, and if MODE is zero, then VALID is passed through an OR circuit 94 and an AND circuit 96 resulting in a validation of the pixel (signal PIXEL_VALID). If the content of D2 79 is not 0, then the pixel is not validated notwithstanding that it may have been generated. When MODE is one (normal mode), PIXEL_VALID becomes valid.

An alternative, approach to the above on-geometric-line sub-mode processing is to implement a technique such as that described herein with respect to FIG. 2. For example, if three bit planes are used as the mask buffer then signal 'i' can be divided into the '+' and '−' interior signals discussed above. The need to regenerate the interior line is avoided by implementation of the logic in Table 1. The disadvantage of such an approach, however, is the extra cost associated with the additional bit plane.

Returning now to the polygon processing steps of this embodiment, after masking the interior of the polygon in the mask buffer, the controller proceeds to Step 3.

Step 3: The purpose of this step is to draw the interior points of the polygon with reference to or under the control of the mask buffer. For example, although points corresponding to triangle 1,4,5 of FIG. 3 are generated, they are not allowed to be written into the frame buffer by the mask buffer. The mask buffer is simultaneously cleared for interior points written to the frame buffer. The X-Y generator and interpolators are set in triangle mode to generate Z values and intensities of the polygon interior points for storage in the depth buffer and drawing to the frame buffer in a way similar to that described above with respect to step 2. The operation of the buffers in this step can be explained as:
Mask buffer:
　If (MB_OLD='i')
　Then MB<='0'
Depth buffer:
　If (Z COMP_OUT="true" & MB_OLD='i')
　Then DB<=Z(X,Y)
Frame buffer:
　If (ZCOMP_OUT="true" & MB_OLD='i')
　Then FB<=R,G,B, at Z(X,Y).

Step 4: The function of this step is to draw the gap points of a stylized polygon boundary, again under the control of the mask buffer (i.e., points with value 'g'). The X-Y generator and interpolators are set in vector mode to generate the polygon edge points. The operations of the buffers are expressed as:
Mask buffer:
　No change
Depth buffer:
　No change
Frame buffer:
　If (ZCOMP_OUT="true" & MB_OLD='g')
　Then FB<=R,G,B at (X,Y).

Step 5: The purpose of this step is to clear the mask buffer subsequent processing of the polygon. The X-Y generator is set in vector mode to generate the polygon boundary, interior points having been cleared from the mask buffer in step 3. The operations of the buffers in this step are:
Mask buffer:
　MB<='0'
Depth buffer & frame buffer:
　No change.

Where the concave polygon under process has only "real edges" with no edge gaps, the described algorithms can be expressed as follows.

Step 1: The boundary of the polygon is masked and the operations of the masked buffer, depth buffer, and frame buffer are:
Mask buffer:
　If (ZCOMP_OUT)="true")
　Then MB<='e' ■ MB_OLD
Depth buffer:
　If (ZCOMP_OUT="true")
　Then DB<=Z(X,Y)
Frame buffer:
　If (ZCOMP_OUT="true")
　Then FB<=R,G,B at (X,Y).

Step 2: The purpose of this step is to mask the interior of the polygon in the mask buffer. The operations of the mask buffer, depth buffer, and frame buffer are:
Mask buffer:
　MB<='i' ■ MB_OLD
Depth buffer & frame buffer:
　No change Step 3: The purpose of this step is to draw the interior points of the polygon with reference to or under control of the mask buffer. The operations of the buffers are:
Mask buffer:
　If (MB_OLD='i')
　Then MB<='0'
Depth buffer:
　If (ZCOMP_OUT="true" & MB_OLD='i')
　Then DB<=Z(X,Y)
Frame buffer:
　If (ZCOMP_OUT="true" & MB_OLD='i')
　Then FB<=R,G,B at (X,Y).

Step 4: By definition, the function of this step is not applicable.

Step 5: The last step is to clear the mask buffer subsequent processing of the polygon. The operations of the buffers are:

Mask buffer:
MB<='0'
Depth buffer & Frame buffer:
No change

In this embodiment, the logic operation '■' is defined as set forth in Table 4.

TABLE 4

| INPUT | | OUTPUT |
|---|---|---|
| '0' | '0' | '0' |
| '0' | 'i' | 'i' |
| '0' | 'e' | 'e' |
| 'i' | '0' | 'i' |
| 'i' | 'i' | 'i' |
| 'i' | 'e' | 'e' |
| 'e' | '0' | 'e' |
| 'e' | 'i' | 'e' |
| 'e' | 'e' | 'e' |

Figure 9:
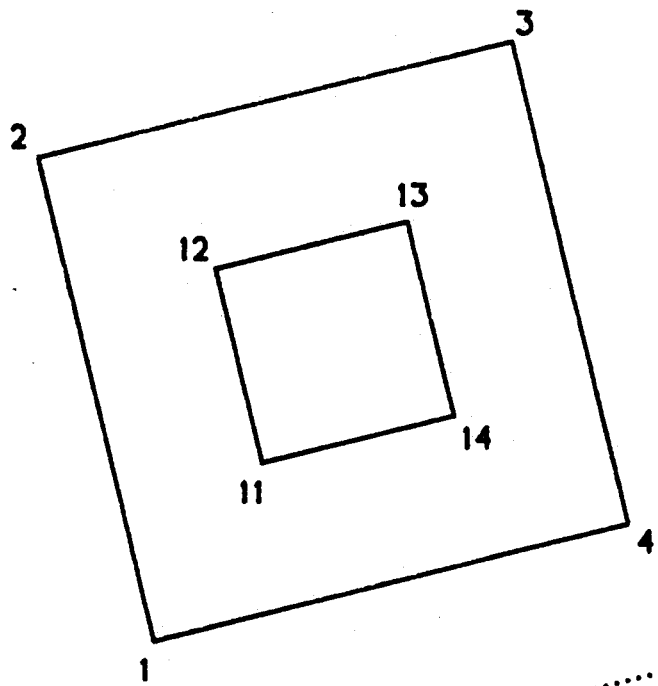
FIG. 9 depicts a polygon with polygonal hole to be processed according to the present invention.

In implementing the method and processor described herein, special consideration must be given to drawing polygons clipped against a front or back Z-axis clipping plane. For example, FIG. 9 depicts a polygon primitive having two sub-areas: 1,2,3,4 and 11,12,13,14. The latter sub-area defines a hole in the former sub-area. The algorithm described above generates the first sub-area (edge and interior points) and the second sub-area (edge and interior points). The EX-OR function inherent in the processing removes the interior points of the second sub-area resulting in the hole. However, points on the edge of the second sub-area (i.e., the boundary of the hole) are not removed since the EX-OR operation does not apply to boundary points.

Figure 10:
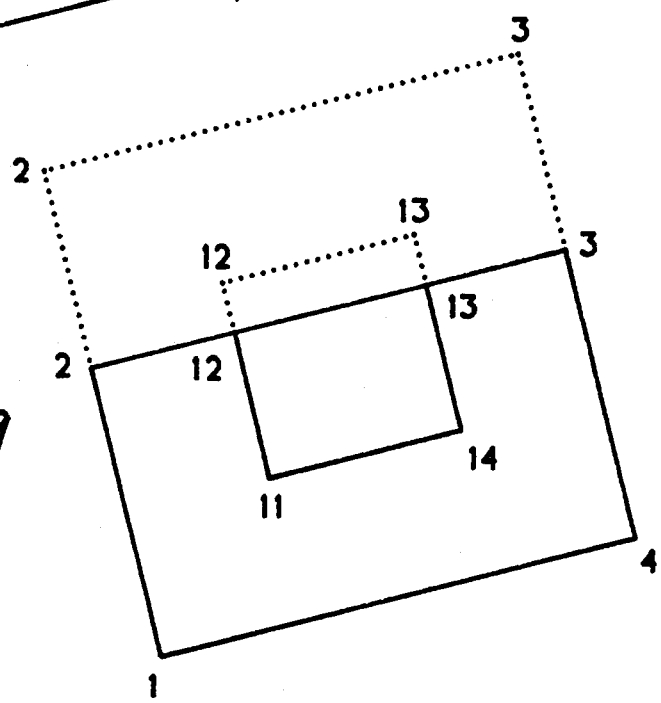
FIG. 10 depicts a new polygon resulting from clipping of the polygon with polygonal hole of FIG. 9 against a Z-axis clipping plane.

With clipping of the polygon primitive against a front or back Z-axis plane of the clipping box, a structure such as that depicted in FIG. 10 can be obtained. As shown, two new sub-areas are generated, namely, sub-areas 1,2',3',4 and 11,12',13',14. Edges 2',3' and 12',13' are referred to as Z-fake edges. A problem arises with these Z-fake edges when generating a mask of the polygon as described above. In particular, the segment 12',13' should not be masked as a boundary of the polygon because it corresponds to the hole. Due to the quantization of screen coordinates (i.e., X and Y are integers), however, the edge 2',3' may not exactly overlap the edge 12',13'. As a result, the EX-OR operation inherent in the processing may fail at some points. This problem does not exist for X-fake or Y-fake edges (i.e., those edges produced by clipping against X-axis or Y-axis clipping planes) because those segments are vertical or horizontal respectively and the EX-OR operation will not fail.

In view of this problem, a software implemented processing solution that works in combination with the described method has been devised and the combination is described in detail below with reference to FIGS. 13-17. An overview of this additional processing technique, however, will initially be presented.

During step 1 of the mask generation process, the Z-fake edges (identified as such by the clipping stage) are not generated but rather are saved in a list (i.e., by storing the two end points definitive of the fake edge). Two such lists are maintained, one for fake edges produced by clipping of the polygon against the back Z-axis clipping plane and the other for Z-fake edges resulting from clipping of the polygon against the front Z-axis clipping plane. Each nonempty list is sorted by X if the slope of the Z-fake edge is closer to a horizontal orientation than to a vertical orientation. Otherwise, it is sorted by Y. Those 3skilled in the art will recognize that the slope of the intersection of the polygon plane with the Z-axis clipping planes can be easily obtained, for example, by inspecting the X and Y components of the polygon normal. Table 5 contains contains the vertex list of Z-fake edges depicted in FIG. 10 before and after the sort.

TABLE 5

| ORDER | BEFORE SORTING | AFTER SORTING |
|---|---|---|
| 1 | 2' | 2' |
| 2 | 3' | 12' |
| 3 | 12' | 13' |
| 4 | 13' | 3' |

To complete step 1 of the mask generation process the Z-fake edges are masked by generating the segments from the first to the second sorted point, then from the third to the fourth, etc. Once this is accomplished, the mask buffer contains the true boundary of the clipped polygon (i.e., segments such as line 12',13' of FIG. 10 are excluded).

In step 2 of the mask generation process, the interior points are generated; however, the definition of each sub-area is modified to include any vertices of other sub-areas falling between the particular Z-fake vertices under consideration. For example new sub-area one is redefined as 1,2',12',13',3',4. It will be observed that vertices 12' and 13' have artifically been added to the polygon vertex list. The second sub-area is still 11,12',13',14. As a result of this processing, the edge 12',13' of the modified first sub-area is coincident with the same edge of the second sub-area and, therefore, the EX-OR operation inherent in the described processing will cancel out the second sub-area edge from the mask.

It is possible, however, that in certain cases a perfect cancellation will not occur. In these special cases, it will be necessary to force a mask clear for the vector going from the second to the third points of the sorted list, from the fourth to the fifth points, etc. In the example, the segment 12',13' is generated and the corresponding mask buffer locations are cleared. An explanation of the need for this action follows.

Figure 11:
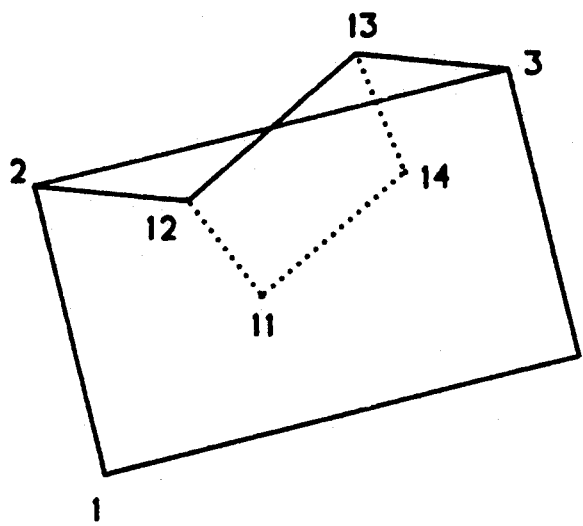
FIG. 11 depicts the clipped polygon of FIG. 10 with the positional errors of the Z-fake edge exaggerated for purposes of explanation.

FIG. 11 depicts the clipped polygon of FIG. 10 in which the positional errors of the fake edges due to the quantization of X and Y are exaggerated for discussion. It is also assumed that the clipping stage provides the vertices of the sub-areas in the following order:

Sub-area 1: 2',1,4,3'
Sub-area 2: 11,12',13',14

Figure 12A:
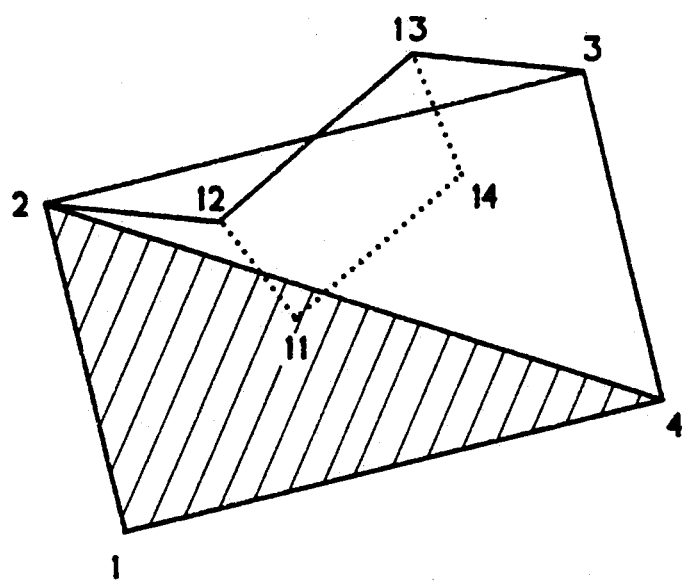
FIGS. 12A-12E graphically depict the exaggerated clipped polygon of FIG. 11 at various stages pursuant to the Z-fake edge processing technique of the present invention.
Figure 12B:
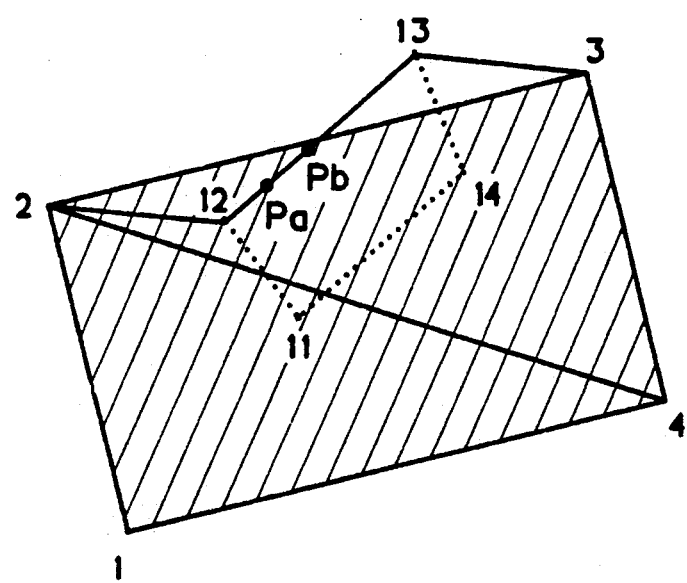
Figure 12C:
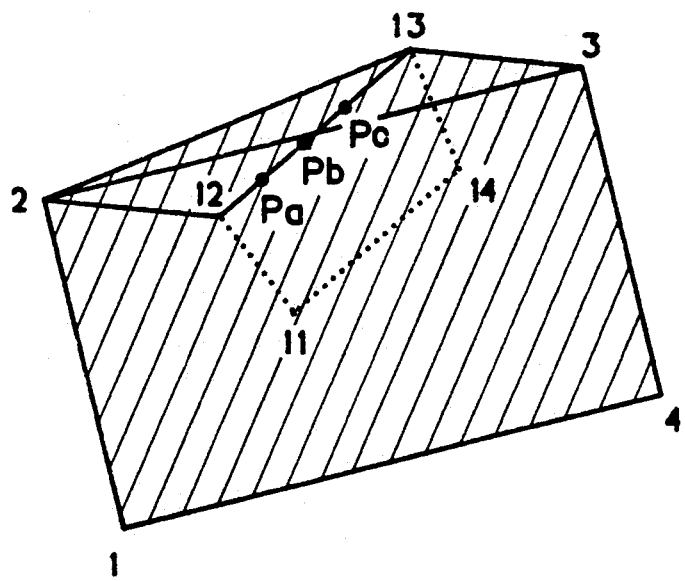

The order of the second sub-area is irrelevant for this explanation. In the first step of the mask generation process, edges 2',1, 1,4 and 4,3' are masked as boundary edges of the polygon. Then edges 11,12'; 13',14 and 14,11 are generated. The Z-fake vertex list is sorted and segments 2,12' and 13,3' are generated. In step two, triangles 2',1,4 (FIG. 12(a)); 2',4,3' (FIG. 12(b)); and 2',3',13' (FIG. 12(c)) are generated. Note that points Pa, Pb, and Pc are masked at this point.

Figure 12D:
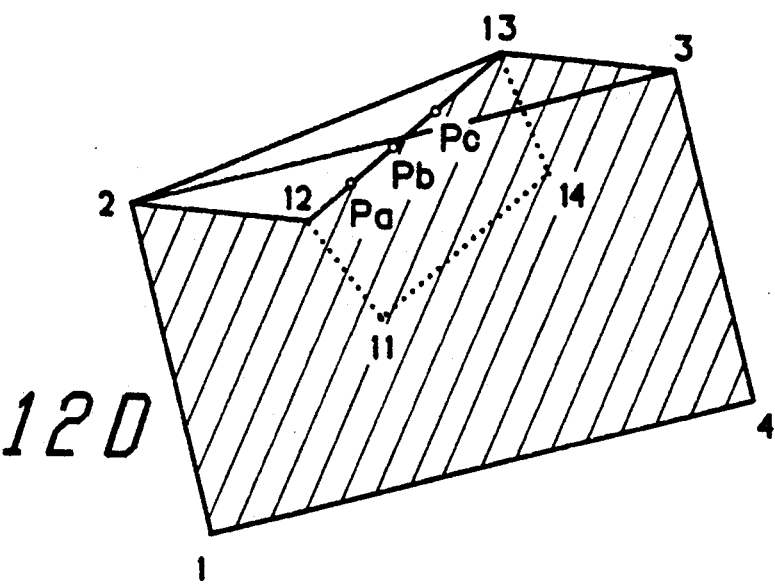
Figure 12E:
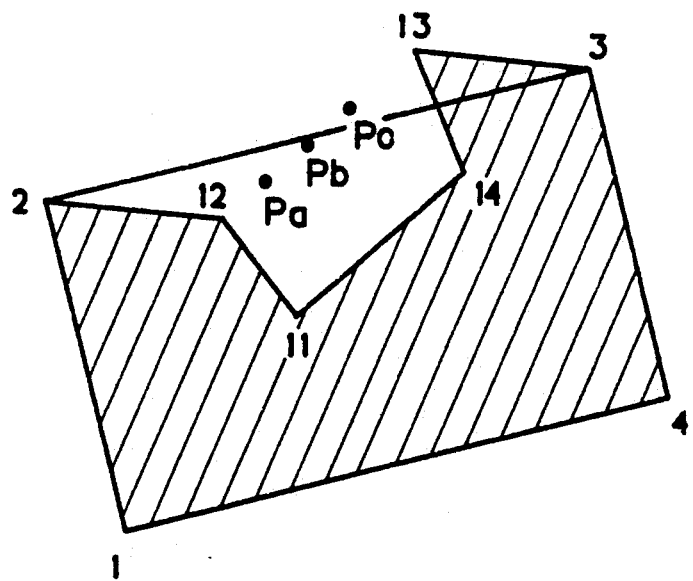

Next, triangle 2',13',12' is generated and the EX-OR function clears out this triangle. Note that the mask corresponding to the common points on the segment 12',13' between triangle 2',12',13' (i.e., points Pa, Pb, and Pc) and the balance of the polygon are cleared as the result of the EX-OR operation (FIG. 12(d)). The polygon 11,12′,13′,14 is generated Which, pursuant to the above description, results in a cancellation of hole 11, 12′,13′,14 from the mask. However, points Pa, Pb and Pc (that were cleared) are wrongly masked by this process (FIG. 12(e)). Thus, the mask buffer points corresponding to segment 12′,13′ must be specially cleared.

One detailed implementation of the above described processing steps 1-5 in combination with the outlined Z-fake edge processing is depicted in the flow diagrams of FIGS. 13-17.

FIG. 13 depicts a flow diagram for step 1, the principal object which step is to mask the boundary of the polygon primitive in the mask buffer to preserve it for subsequent processing. Again, a polygon primitive may be consist of several distinct sub-areas. After entering at "Begin" 100, the controller inquires whether the last sub-area of the polygon has been processed through step 1, "Last Sub-Area Processed?". If not, the controller proceeds to instruction 104 "Get 1st Vertex Data" and hence to inquiry 106 "Last Vertex of Sub-area?". Since processing has just commenced, the answer is "no" and flow is to 108 "Get Next Vertex Data." If the last vertex of the sub-area under process was present, then the controller would have been directed from inquiry 106 to return to inquiry 102.

From instruction 108, the controller determines whether the vector between the first vertex data obtained at instruction 104 and the next vertex data obtained at instruction 108 is a "regular edge" of the sub-area. As explained above, boundary flags are provided as part of the data list and define each vertex as falling on a "real edge," a "regular edge" or a "fake-Z front edge or fake-Z back edge." A "regular edge" corresponds to all interior points, or gap pixels, of the polygon primitive. If "yes", the controller proceeds to command 112, "Generate Vector" where the signal 'g' is masked to the mask buffer along the regular edge. Again, no color is sent to the frame buffer in step 1 for 'g' pixels. Subsequent command 112 flow returns to inquiry 106.

If the answer to inquiry 110 is "no", the controller proceeds to inquiry 114 "Is Edge "Real Edge?" where it determines whether the vector defines a real edge of the polygon primative (i.e., either solid or styled.) If "yes", the controller generates the vector at command 116 "Generate Vector" to mask the appropriate signal 'e' or 'g' in the mask buffer pursuant to the algorithms presented above and the color R,G,B, i.e., if an edge segment, to the frame buffer. If the answer to inquiry 114 is "no", then the controller proceeds to inquiry 118 "Is Edge Z-fake?". Again if "no", the controller returns to inquiry 106.

If the edge does comprise a fake Z edge, then from inquiry 118 the controller proceeds to inquiry 120 "Front Z-fake?" where it determines whether the fake Z edge lies along the front Z-axis clipping boundary or the back Z-axis clipping boundary. If the edge corresponds to the back Z-axis clipping boundary, then flow is to instruction 122 "Save Edge Vertices in Z-fake Vertex List (Back)." Conversely, if the Z-fake edge comprises a front edge, the controller stores the Z-fake edge vertices in a separate list 124 "Save Edge Vertices in Z-fake Vertex List (Front)." Subsequent processing either instruction 122 or 124, the controller returns to inquiry 106.

If the answer to inquiry 102 is "yes", then the controller proceeds to inquiry 126 "Any Z-fake Back Edge?". This inquiry directs the controller to determine whether vertices have been stored in the Z-fake vertex list (back) created at instruction 122. If "yes", then the controller sorts the list of Z-fake back vertices, 128 "Sort Z-fake Vertex List (Back)," and generates vectors P1-P2, P3-P4, . . . from the stored list, 130 "Gen. Vectors P1-P2, P3-P4, . . . ". Since fake Z edges are assigned interior color, the mask buffer receives 'g' signals for the generated vectors and nothing is written to the frame buffer. Subsequent instruction 130 or, alternatively, if the answer to inquiry 126 is "no", the controller is directed to inquiry 132 "Any Z-fake Front Edge?". If "no", the controller proceeds to step 2 of the present drawing process.

If "yes", then flow is to instruction 134 "Sort Z-fake Vertex List (Front)" and hence to instruction 136 "Gen. Vectors: P1-P2, P3-P4, . . . ". Instructions 134 & 136 correspond to instructions 138 & 130, respectively, in that they direct the controller to sort and generate the non-overlapping fake Z edges along the front Z-axis clipping plane and mask these edges with a signal 'g' in the mask buffer. Again, drawing to the frame buffer is delayed. Upon completion of instruction 136, the controller is finished with step 1 for the polygon primitive under process and proceeds to step 2.

The purpose of step 2 is to mask the interior of the polygon in the mask buffer. Initially, the controller is directed to determine whether the last sub-area has been processed, 138 "Last Sub-Area Processed?". Since Step 2 processing just commenced, the answer is "no" and the controller obtains the initial vertex data of a sub-area, 140 "Get 1st Vertex Data of Sub-Area," and hence inquires whether the last vertex of the sub-area has been processed, 142 "Last Vertex Processed?". If "no", the controller inquires whether the vertex data obtained corresponds to a vertex of a fake Z edge, "Is Edge Z-Fake?". If "no", the controller enters a subroutine ALPH1, 146 "Call ALPH1."

Figure 14:
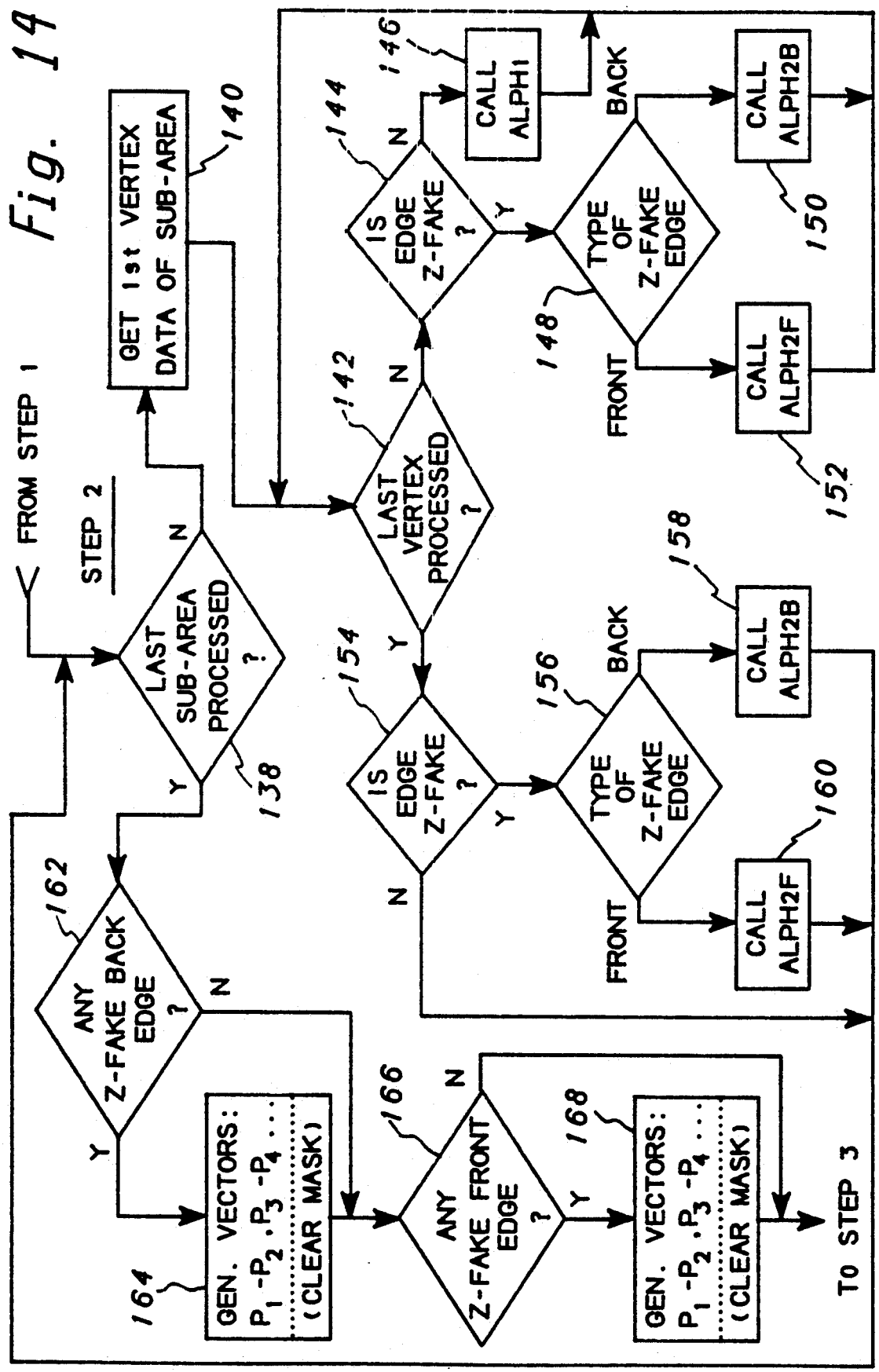
FIGS. 14, 14A & 14B are a flow diagram representation of a second processing step of the present invention.
Figure 14A:
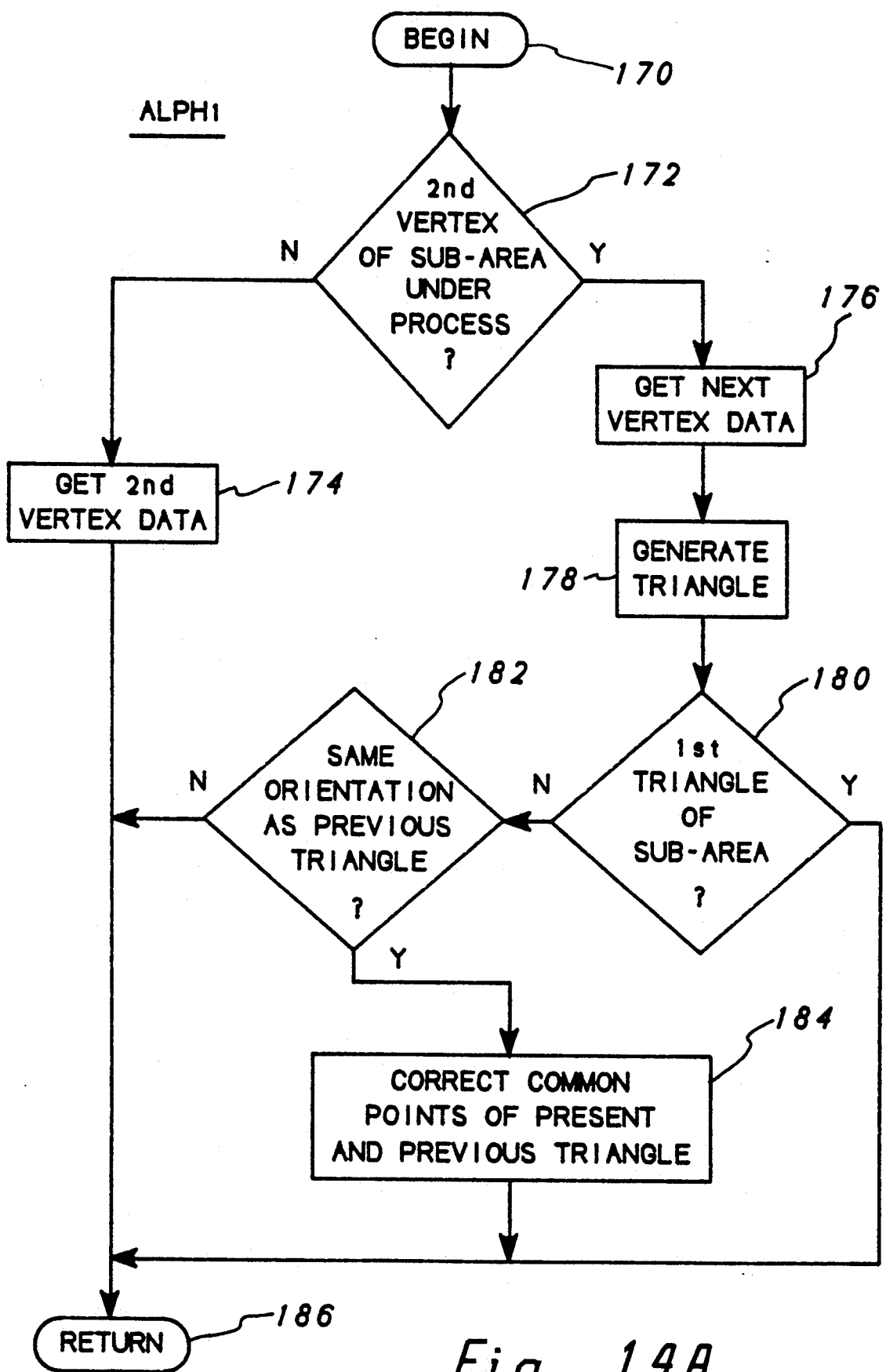

ALPH1, outlined in FIG. 14A, directs the controller in generating triangles with no Z-fake edges. The subroutine is entered at 170 and the controller initially determines whether the vertex under examination comprises a second vertex of the sub-area under process, 172 "2nd Vertex of Sub-Area Under Process?". If "no", the controller obtains a second vertex, 174 "Get 2nd Vertex Data" and then returns 186 to the processing set forth in FIG. 14 at inquiry 142.

If the second vertex of the sub-area has been obtained, then from inquiry 172 the controller obtains a third vertex, 176 "Get Next Vertex Data," and hence generates a triangle using the three vertices, 178 "Generate Triangle." Subsequent generation of the triangle, the controller determines whether the triangle just generated is the first triangle of the sub-area under process, and, if "yes", returns 186 to the main step 2 processing of FIG. 14. If, on the other hand, the triangle created at command 178 is not the first of the sub-area, then the controller determines whether the orientation of the previous triangle is the same as the orientation of the present triangle, 182 "Same Orientation as Previous Triangle?". If "no", flow returns 186 to the main processing of step 2. If "yes", then the controller corrects all common points of the present and previous triangles which have been erased by the exclusive-or function inherent in the processing algorithm (discussed above in detail with reference to FIG. 8). Subsequent instruction 184, return 186 is made to the main processing of step 2 at inquiry 142.

Figure 14B:
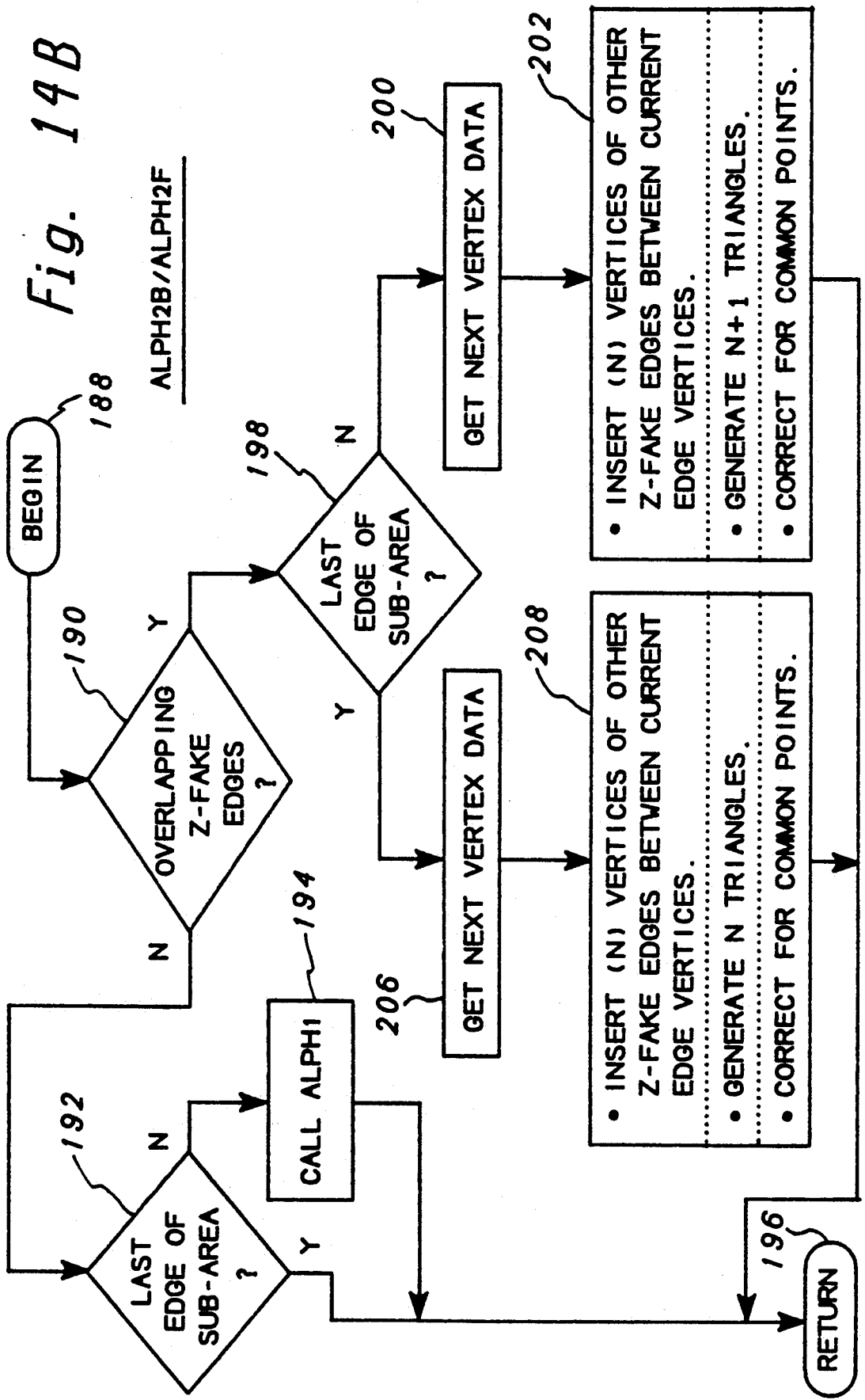

Returning to inquiry 144, if the answer is "yes", then the controller determines whether the vertex corresponds to a Z-fake front edge or a Z-fake back edge, 148 "Type of Z-Fake Edge?". If the edge is a Z-fake back edge a subroutine ALPH2B is called, 150 "Call ALPH2B." Alternatively, if the edge comprises a Z-fake front edge, subroutine ALPH2F is called, 152 "Call ALPH2F." Subroutines ALPH2B and ALPH2F are identical except that they access the different lists compiled at commands 122 and 124 of step 1. ALPH2B accesses the saved edge vertices in Z-fake vertex list (back) and ALPH2F accesses the saved edge vertices in Z-fake vertex list (front). The ALPH2B/ALPH2F subroutine is outlined in FIG. 14B.

After entering the subroutine at 188, the controller ascertains whether overlapping Z-fake edges are present, 190 "Overlapping Z-Fake Edges?". If "no", then the controller inquires whether the last edge of the sub-area has been processed, 192 "Last Edge of Sub-Area?". Again if "no", the subroutine ALPH1 is entered, 194 "Call ALPH1". Subsequent ALPH1 subroutine processing, return 196 is made to the main processing flow of step 2 at inquiry 142. The processor is similarly directed to return 196 to inquiry 142 if the answer to inquiry 192 is "yes."

If overlapping Z-fake edges do exist, then the controller determines whether the overlapping Z-fake edge is the last edge to be processed, 198 "Last Edge of Sub-Area?". If "no", the next piece of vertex data is obtained, 200 "Get Next Vertex Data," subsequent which the controller proceeds to instruction 202. At instruction 202, the controller implements the above described Z-fake processing. In particular, N vertices of other, corresponding Z-fake edges are inserted between the current edge vertices, the resultant N+1 triangles are generated and correction is made for any common points along the Z-fake edge, 202 "Insert (N) Vertices of Other Z-Fake Edges Between Current Edge Vertices; Generate N+1 Triangles; and Correct For Common Points." If the overlapping Z-fake edges align along the last edge of the sub-area, then from inquiry 198 the controller obtains the next vertex data, 206 "Get Next Vertex Data," and hence proceeds to instruction 208, "Insert (N) Vertices of Other Z-fake Edges Between Current Edge Vertices; Generate N triangles; Correct for Common Points." Instruction 208 is similar to instruction 202 except that when the Z-fake overlapping edges are not the last edge of the sub-area to be processed, only N triangles are generated. Subsequent instruction 202 or 208, the controller returns 196 to the main processing loop of step 2.

Once the last vertex has been processed, the controller proceeds from inquiry 142 to inquiry 154 "Is Edge Z-fake?". If the last vertex is not along a fake Z-edge, then the controller returns to inquiry 138. If the answer to inquiry 154 is "yes", however, then the controller determines the type of Z-fake edge under process, 156 "Type of Z-fake edge?". If the Z-fake edge is along the back Z-axis clipping plane, then the controller calls subroutine ALPH2B, 158 "Call ALPH2B." Otherwise, the controller calls subroutine ALPH2F, 160 "Call ALPH2F." Subsequent processing instructions 158 or instruction 160, the controller returns to inquiry 138.

Returning to inquiry 138, if the answer is "yes", the controller determines whether the sub-area contains a fake Z edge along the back Z-axis clipping plane, 162 "Any Z-fake Back Edge?". If "yes", then the controller generates vectors to clear the mask along the Z-fake back edge, 164 "Gen. Vectors: P1-P2, P3-P4 . . . ". Subsequent instruction 164, the controller proceeds to determine whether any Z-fake front edges are present, 166 "Any Z-fake front edge?". If the answer to inquiry 162 is "no", then flow is to inquiry 166. Assuming front Z-fake edges are present, the controller generates vectors to clear the mask of the front Z-fake edges, 168 "Gen. Vectors P1-P2, P3-P4 . . . ". Subsequent instruction 168 or, alternatively, if the answer to inquiry 166 is "no", the controller is directed to step 3 of the processing algorithm.

Figure 15:
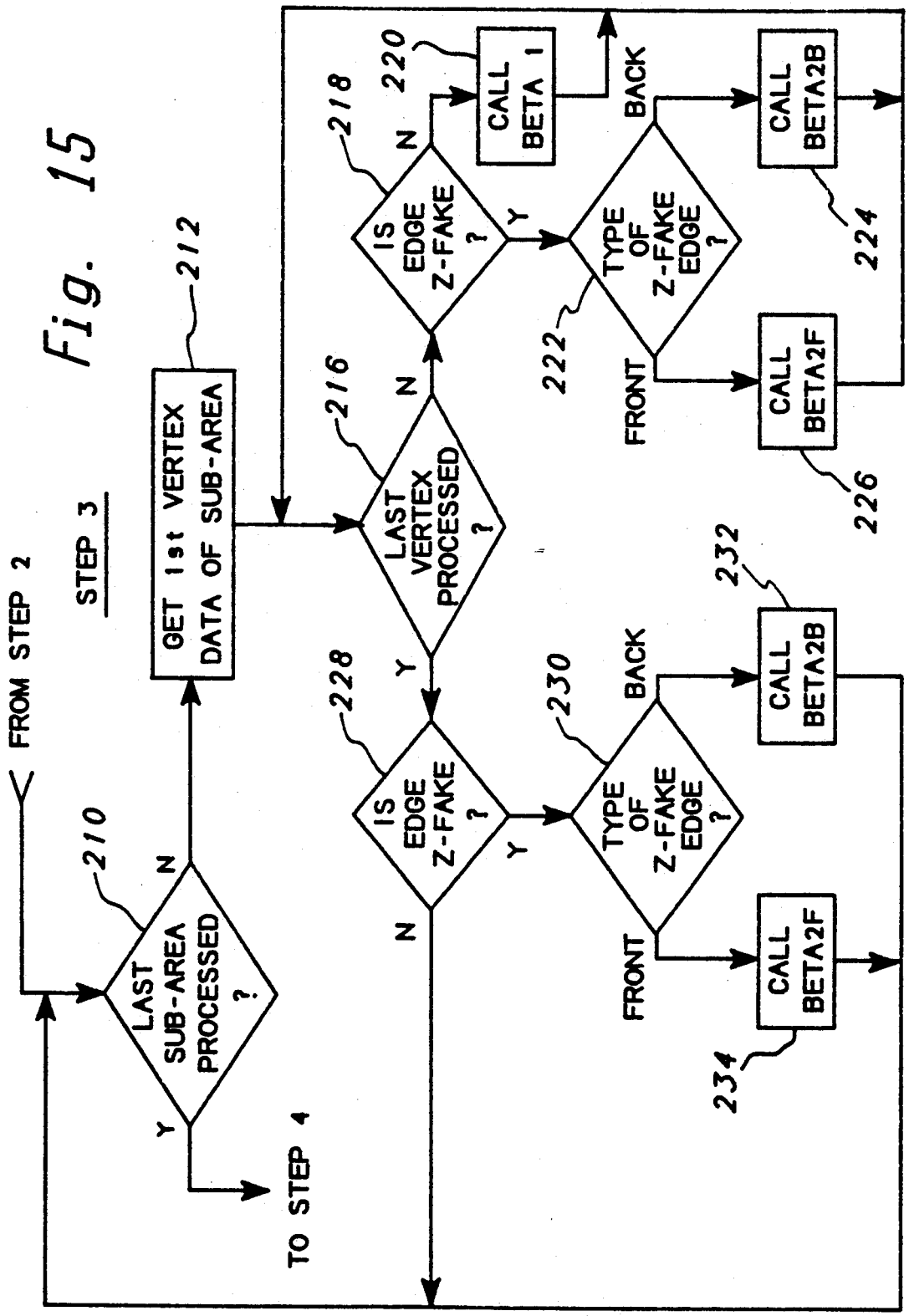
FIGS. 15, 15A & 15B are a flow diagram representation of a third processing step of the present invention.

One embodiment of the main step 3 processing is depicted in FIG. 15. The purpose of this step is to draw the interior of the polygon in the frame buffer. From step 2, the controller initially determines whether last sub-area has been processed, 210 "Last Sub-Area Processed?". If yes, then the controller is directed to step 4. If, on the other hand, the answer to inquiry 210 is "no", then the controller obtains a first vertex data of the sub-area, 212 "Get 1st Vertex Data of Sub-Area," and inquires whether the last vertex of the sub-area has been processed, 216 "Last Vertex Processed?". If "no", inquiry is made whether the vertex data obtained is flagged as a Z-fake edge, 218 "Is Edge Z-Fake?". If "no", the controller enters a subroutine BETA1, 220 "Call BETA1."

Figure 15A:
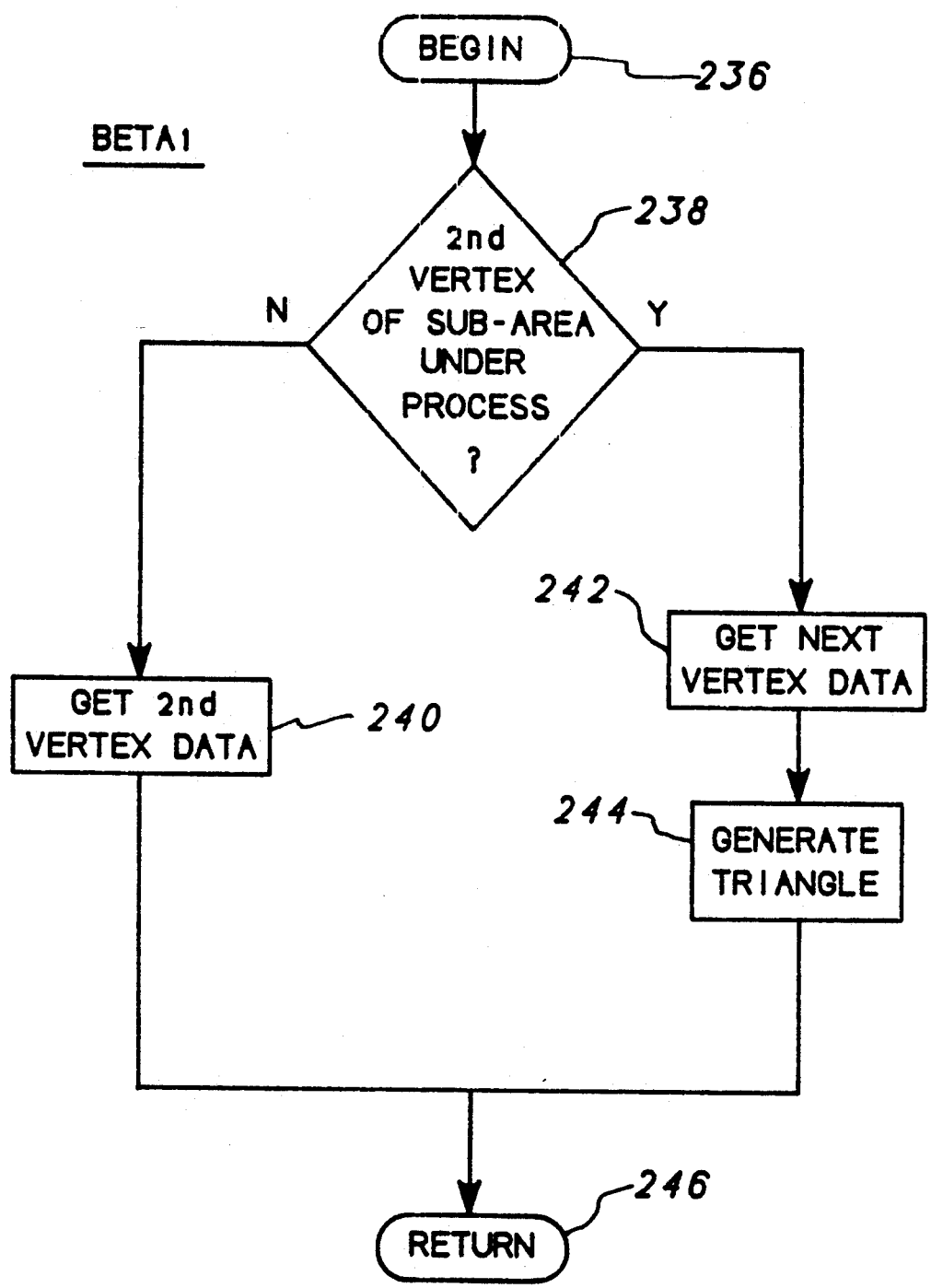

BETA1, depicted in FIG. 15A, directs the controller in generating triangles with no Z-fake edges. The subroutine is entered at 236 and the controller initially determines whether the vertex under examination comprises a second vertex of the sub-area under process, 238 "2nd Vertex of Sub-Area Under Process?". If "no", the controller obtains a second vertex, 240 "Get 2nd Vertex Data," and returns 246 to the processing routine of FIG. 15 at inquiry 216.

If the 2nd vertex in the sub-area has been obtained, then from inquiry 238 the controller obtains a 3rd vertex, 242 "Get Next Vertex Data," and with the three vertices generates a triangle, 244 "Generate Triangle." Subsequent generation of the triangle, return 246 is made to the main routine processing of FIG. 15 at inquiry 216.

Figure 15B:
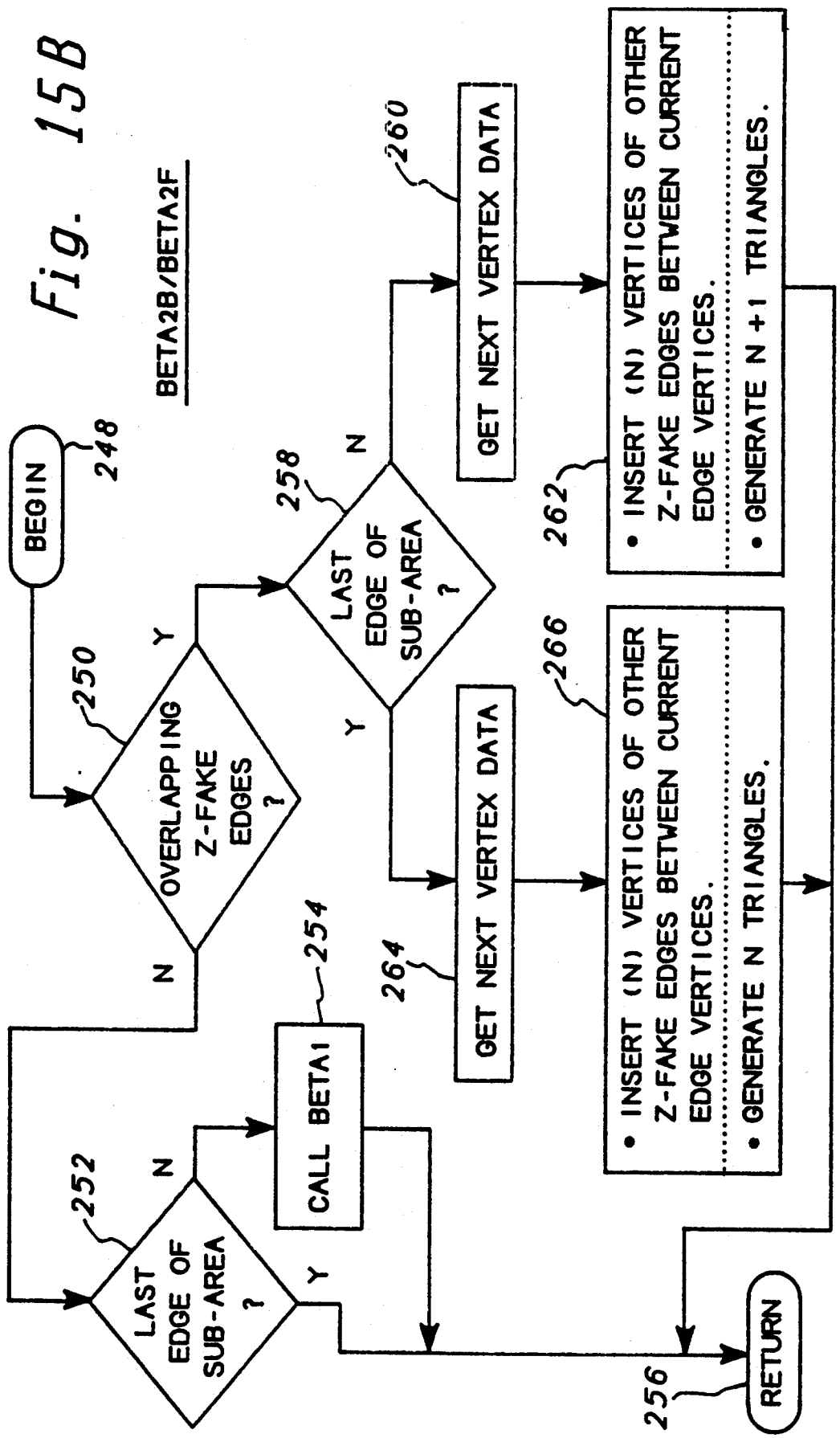

Returning to inquiry 218, if the answer is "yes", then the controller determines whether the vertex corresponds to a Z-fake front edge or a Z-fake back edge, 222 "Type of Z-Fake Edge?". If the edge is a Z-fake back edge, then the controller calls a subroutine BETA2B, 224 "Call BETA2B." Alternatively, if the edge comprises a Z-fake front edge, a subroutine BETA2F is called, 226 "Call BETA2F." Subroutines BETA2B and BETA2F are identical except that they access the two different lists compiled at commands 122 and 124 of step 1. BETA2B accesses the saved edge vertices in Z-fake vertex list (back) and BETA2F accesses the saved edge vertices in Z-fake vertex list (front). The BETA2B-/BETA2F subroutine is outlined in FIG. 15B.

After entering the subroutine at 248, the controller ascertains whether overlapping Z-fake edges are present, 250 "Overlapping Z-fake Edges?". If "no", the controller inquires whether the last edge of the sub-area has been processed, 252 "last edge of sub-area?" and if "no" again, subroutine BETA1 is entered, 254 "call BETA1." Subsequent BETA1 subroutine processing, the controller returns 256 to the main processing flow of step 3 at inquiry 216. If the answer to inquiry 252 is "yes", the processor similarly returns 256 to inquiry 216.

If overlapping Z-fake edges do exist, then the controller determines whether the Z-fake edge is the last edge to be processed, 258 "Last Edge of Sub-Area?". If "no", the next piece of vertex data is obtained, 260 "Get Next Vertex Data," and the controller proceeds to instruction 262 "Insert (N) Vertices of Other Z-Fake Edges Between Current Edge Vertices; Generate N+1 Triangles". If the overlapping Z-fake edges align along the last edge of the sub-area, then from inquiry 258 the controller obtains the next vertex data, 264 "Get Next Vertex Data", and hence proceeds to instruction 266 "Insert (N) Vertices of Other Z-Fake Edges Between Current Edge Vertices; Generate N Triangles". Instructions 262 and 266 are identical to instructions 202 and 208, respectively, except that there is no need to correct for common points. Subsequent instruction 262 or 266, the controller returns 256 to the main processing loop of step 3.

If the answer to inquiry 216 is "yes", then the controller determines whether the vertex corresponds to a Z-fake edge, 228 "Is Edge Z-Fake?", and again if "yes", identifies the type of Z-fake edge, 230 "Type of Z-Fake Edge?". If the Z-fake edge is along the back of Z-axis clipping plane, subroutine BETA2B is called, 232 "Call BETA2B". Otherwise, subroutine BETA2F is called 234, "Call BETA2F." Subsequent processing of subroutine BETA2B or BETA2F, the controller returns to inquiry 210. Also, if the vertex is not along a Z-fake edge, the controller returns directly from inquiry 228 to inquiry 210.

Figure 16:
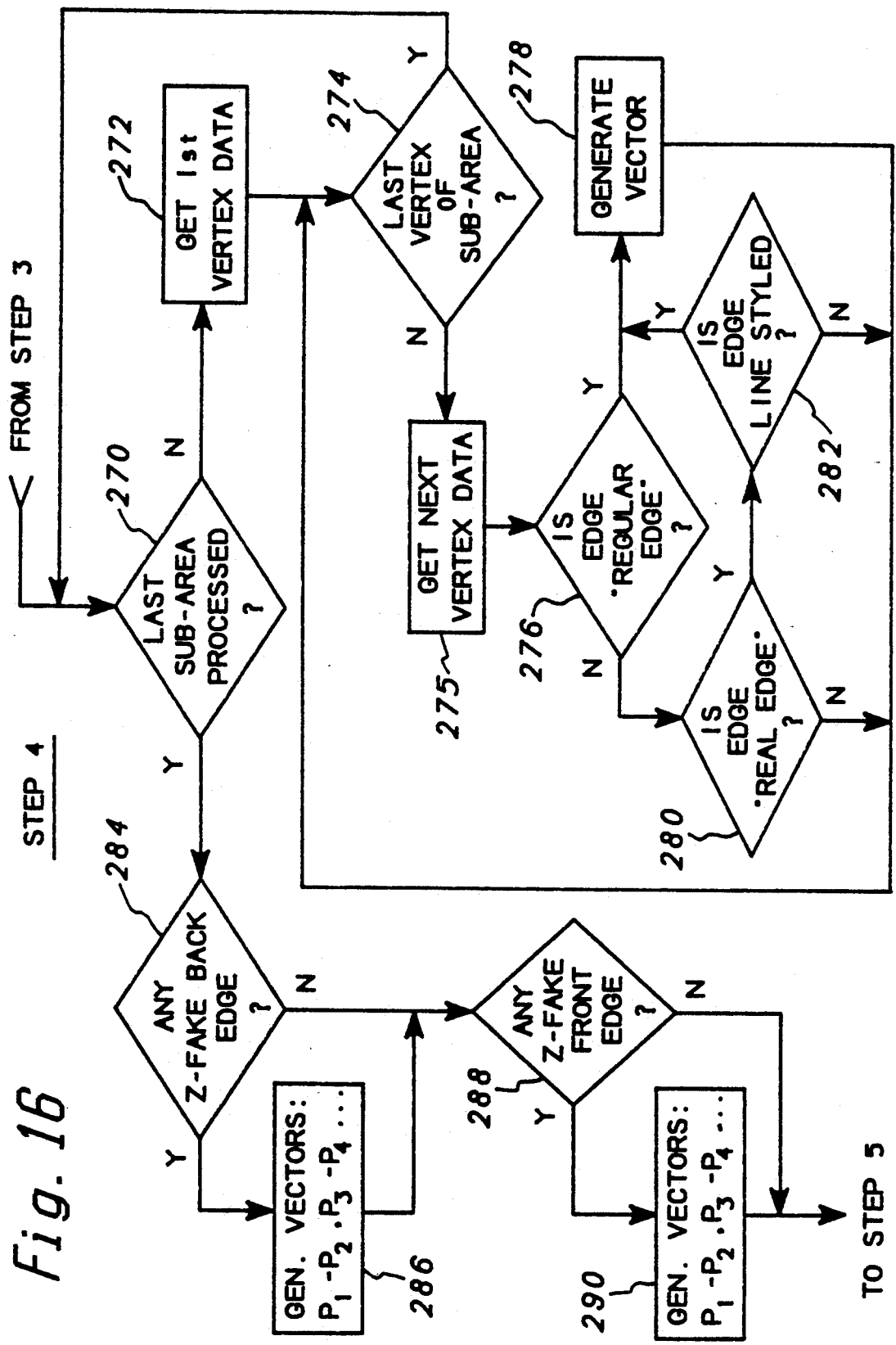
FIG. 16 is a flow diagram representation of a fourth processing step of the present invention.
Figure 17:
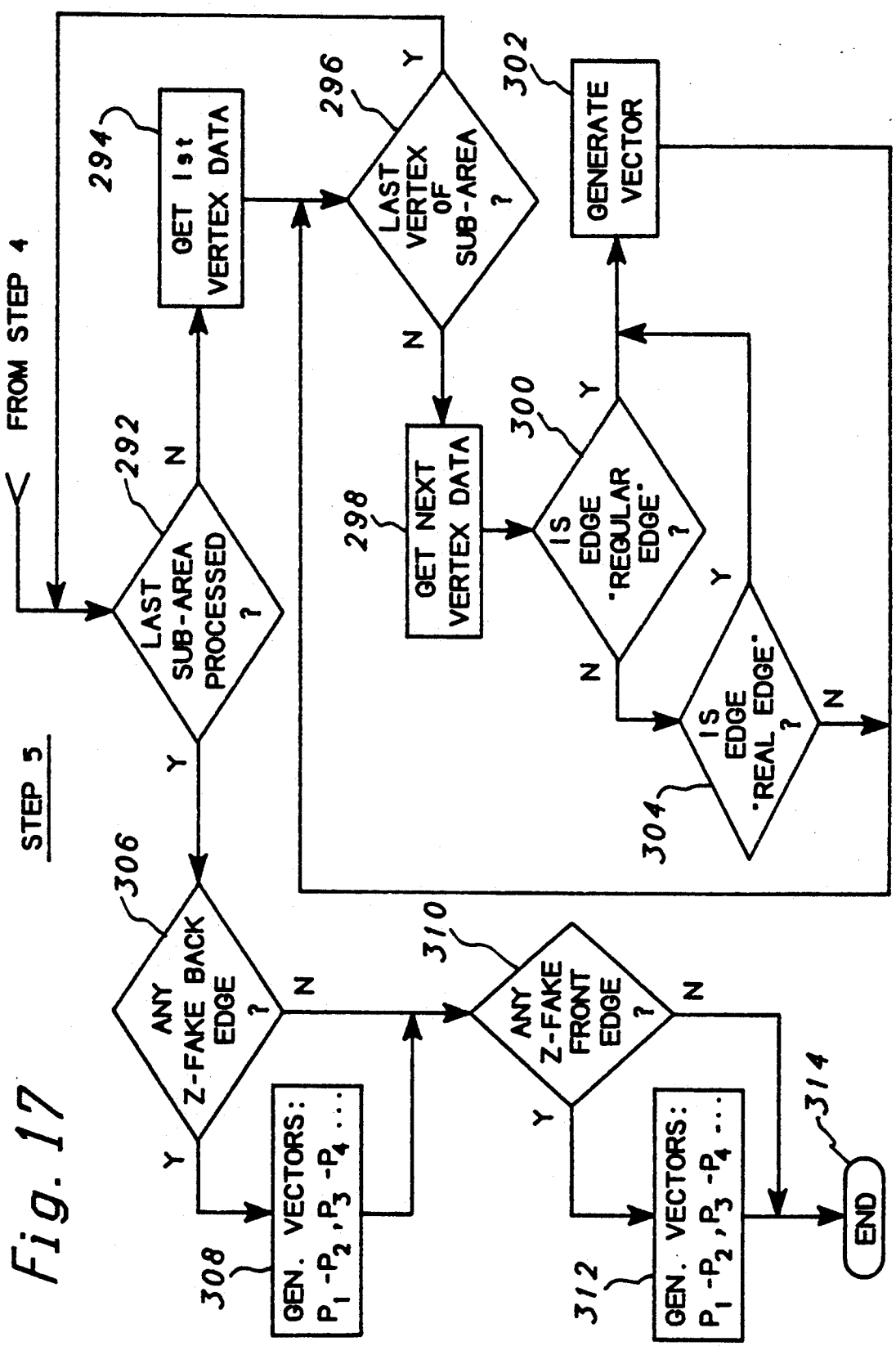
FIG. 17 is a flow diagram representation of a fifth processing step of the present invention.

From step 3, the controller is directed in step 4 to draw the gap points of a stylized polygon boundary. One processing embodiment for step 4 is depicted in FIG. 16. As shown, the controller initially determines whether the last sub-area has been processed, 270 "Last Sub-Area Processed?". If "no", a first vertex is obtained, 272 "Get 1st Vertex Data" and hence inquiry is made whether the vertex data obtained corresponds to the last vertex of a sub-area, 274 "Last Vertex of Sub-Area?". If "yes", the controller returns to inquiry 270. If, on the other hand, the last vertex of the sub-area has not been processed, then the controller obtains a next vertex, 275 "Get Next Vertex Data" and inquires whether the edge defined by the two vertices is a "regular edge" of the polygon, 276 "Is Edge Regular Edge?". If "yes", then pursuant to the algorithm described above, all pixels of the edge are assigned the interior color, 278 "Generate Vector." If the answer to inquiry 276 is "no", then the controller determines whether the edge is a "real edge", 280 "Is Edge "Real Edge"?", and if "yes", then whether the edge is styled, 282 "Is Edge Line-Styled?". If "yes", the vector is generated, 278 "Generate Vector" and gap pixels are drawn pursuant to the algorithm. If the edge is not line styled then no vector is generated since the edge is already drawn in step 1. If the answer to inquiries 280 or 282 is "no", the controller returns to inquiry 274 for further processing. Similarly, from generate vector command 278, the processor returns to 274.

Once the last sub-area has been processed, then from inquiry 270 then controller determines whether there is any Z-fake back edge, 284 "Any Z-Fake Back Edge?". If "yes", then vectors P1-P2, P3-P4 . . . are generated so that the interior color may be assigned thereto, 286 "Gen. Vectors: P1-P2, P3-P4, . . . ". Subsequent instruction 286, or if the answer to inquiry 284 is "no", the controller proceeds to determine whether there are any Z-fake front edges, 288 "Any Z-Fake edge?". If "yes", then corresponding vectors P1-P2, P3-P4, . . . are generated, 290 "Gen. Vectors: P1-P2, P3-P4, . . . ". Subsequent instruction 290 the controller is directed to step 5. Similarly, if no Z-fake front edges exist for the polygon primitive then the controller is sent to step 5.

The purpose of step 5 is to erase any edges remaining in the mask buffer subsequent processing of the last sub-area. An overview of step 5 is presented in FIG. 17. As shown, the controller initially determines whether the last sub-area has been processed, 292 "Last Sub-Area Processed". If "no", then a first vertex data is obtained, 294 "Get 1st Vertex Data." Subsequently, the controller determines whether the last vertex of the sub-area has been processed, 296 "Last Vertex of Sub-Area" and if "yes" returns to inquiry 292. If the last vertex has not been processed, then the controller obtains the next vertex data, 298 "Get Next Vertex Data" and determines whether the edge defined by the two vertices is a regular edge, 300 "Is Edge Regular Edge?". If "yes", then a vector is generated to erase the edge 302 "Generate Vector." If the edge is not a regular edge, the controller determines whether the edge is a "real edge", 304 "Is Edge "Real Edge"?" and, again if "yes", generates a vector to erase the edge, 302 "Gen. Vector." Subsequent instruction 302 the controller returns to inquiry 296. If the answer to inquiry 304 is "no", the controller returns directly to 296.

After the last sub-area has been processed, the controller determines whether there are any Z-fake back edges, 306 "Any Z-Fake Back Edge?" and if "yes" generates vectors to erase the edges, 308 "Gen. Vectors; P1-P2, P3-P4 . . . ". From instruction 308, or directly from instruction 306 if the answer is "no", the controller determines whether there are any Z-fake front edges, 310 "Any Z-Fake Front Edge?" and if "yes", generates vectors to erase the edges, 312 "Gen. Vectors: P1-P2, P3-P4, . . . ". After erasing back and front Z-fake edges, step 5 processing is terminated 314.

It will be observed from the above that this invention fully meets the objectives set forth herein. A method and processor for a computer graphics display system are provided for efficiently processing concave polygons, including self-intersecting polygons and polygons with polygonal holes. In addition, the described method and processor are implemented using many existing hardware components of a typical computer graphics display system.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. In a computer graphics display system having a display processor and display means including a frame buffer for storing individual pixels for each of a plurality of lines to be displayed on a display monitor, said frame buffer being organized into an M×N plurality of addressable constituent blocks of pixels, an improved method for drawing a concave polygon in said frame buffer, said method using a mask buffer organized into an M×N plurality of addressable constituent pixels, said method comprising the steps of:
  (a) masking the pixels in said mask buffer corresponding to the boundary of said polygon and drawing the pixels in said frame buffer corresponding to the boundary of said polygon;
  (b) subsequent to said masking step (a), employing combinatorial logic to mask the pixels in said mask buffer corresponding to the interior of said polygon while preserving the masked pixels in said mask buffer corresponding to said polygon boundary and excluding any hole in the interior of said polygon; and
  (c) subsequent to said masking step (b), drawing the pixels in said frame buffer corresponding to the interior of said polygon with reference to the masked polygon interior pixels in said mask buffer.

2. The method of claim 1, wherein said method further includes:
  tessellating the polygon into a set of triangles, each of said triangles having an interior bounded by the edges of the triangle, adjacent pairs of triangles having a region of overlap along their common edge, each of said triangles being represented by an ordered set of vertices, said triangles having a common first vertex, each of said triangles having a positive or negative orientation in accordance with the sign of the cross product of a first vector extending between the first and second vertices of said triangle and a second vector extending between the first and third vertices of said triangle;
and wherein said interior pixel masking step (b) includes:
  determining the orientation of each of said triangles; and
  processing the pixels in said mask buffer corresponding to the interior of each triangle such that interior pixels of adjacent triangles of the same orientation are masked while interior pixels of adjacent triangles of different orientation are unmasked within the triangles' region of overlap.

3. The method of claim 1, wherein said polygon is defined by multiple polygonal sub-areas defined by respective sets of vertices and wherein said steps (a)–(c) each process all of said sub-areas.

4. The method of claim 1, further comprising the step of clearing said mask buffer subsequent to drawing of said concave polygon in said frame buffer.

5. In a computer graphics display system having a display processor and display means which include a frame buffer for storing individual pixels for each of a plurality of lines to be displayed on the display monitor and a depth buffer for storing Z values for individual pixels, said frame buffer and said depth buffer each being organized into an M×N plurality of addressable constituent blocks of pixels, an improved method for drawing a concave polygon, with or without a styled boundary defined by edge gaps and edge segments, said method using a mask buffer organized into an M×N plurality of addressable constituent pixels, said method comprising the steps of:
  (a) masking the pixels in said mask buffer corresponding to the edge gaps and edge segments definitive of said polygon boundary;
  (b) storing Z values in said depth buffer corresponding to the edge gaps and edge segments definitive of the polygon boundary, said depth buffer storing being made with reference to the content of said mask buffer;
  (c) drawing the pixels in said frame buffer corresponding to the edge segments of said polygon boundary, said frame buffer drawing being made with reference to the content of said mask buffer;
  (d) accomplishing said steps (a)–(c) substantially simultaneously;
  (e) masking the pixels in said mask buffer corresponding to the interior of said polygon while preserving the masked pixels in said mask buffer corresponding to the edge gaps and edge segments of said polygon boundary;
  (f) simultaneously storing Z values in said depth buffer and drawing pixels in said frame buffer corresponding to interior points of said polygon with reference to the content of said mask buffer; and
  (g) drawing the pixels in said frame buffer corresponding to the edge gaps of said polygon boundary, said drawing of gap pixels in said frame buffer being made with reference to the content of said mask buffer.

6. The method of claim 5, wherein said method further includes:
  tessellating the polygon into a set of triangles, each of said triangles having an interior bounded by the edges of the triangle, adjacent pairs of triangles having a region of overlap along their common edge, each of said triangles being represented by an ordered set of vertices, said triangles having a common first vertex, each of said triangles having a positive or negative orientation in accordance with the sign of the cross product of a first vector extending between the first and second vertices of said triangle and a second vector extending between the first and third vertices of said triangle;
and wherein said interior pixel masking step (e) includes:
  determining the orientation of each of said triangles; and
  processing the pixels in said mask buffer corresponding to the interior of each triangle such that interior pixels of adjacent triangles of the same orientation are masked while interior pixels of adjacent triangles of different orientation are unmasked within the triangles' region of overlap.

7. The method of claim 6, further comprising the step of clearing the pixels in said mask buffer subsequent to drawing of said polygon in said frame buffer.

8. Display processor for a computer graphics display system having display means including a frame buffer for storing individual pixels for each of a plurality of lines to be displayed on a display monitor, said frame buffer being organized into an M×N plurality of addressable constituent blocks of pixels, said display processor being capable of drawing in said frame buffer a concave polygon, said display processor comprising:
  edge/triangle generation means connected to receive signals from said controller;
  first combinational logic means connected to receive signals from said edge/triangle generation means;
  a mask buffer organized into an M×N plurality of constituent pixels, said mask buffer being connected to receive pixel values from said first combination logic means and address signals from said edge/triangle generation means, said pixel values from said first combinational logic means and said address signals from said edge/triangle generation means being used to create a mask of the boundary of said polygon during a first pass and a mask of the interior of said polygon while preserving said mask of said boundary of said polygon in said mask buffer during one or more subsequent passes; and
second combinational logic means connected to receive address signals from said edge/triangle generation means and pixel values from said mask buffer, said second combinational logic means outputting to said frame buffer one of an edge signal and a fill signal for each X,Y address processed, said edge signal corresponding to a boundary pixel of said polygon and said fill signal corresponding to an interior pixel of said polygon.

9. The display processor of claim 8, wherein said edge/triangle generation means includes:
   means for tessellating the polygon into a set of triangles, each of said triangles having an interior bounded by the edges of the triangle, adjacent pairs of triangles having a region of overlap along their common edge, each of said triangles being represented by an ordered set of vertices, said triangles having a common first vertex, each of said triangles having a positive or negative orientation in accordance with the sign of the cross product of a first vector extending between the first and second vertices of said triangle and a second vector extending between the first and third vertices of said triangle;
   means for determining the orientation of each of said triangles;
and wherein said first combinational logic means includes:
   means for processing the pixels in said mask buffer corresponding to the interior of each triangle such that the interior pixels of adjacent triangles of the same orientation are masked while interior pixels of adjacent triangles of different orientation are unmasked within the triangles' region of overlap.

10. The display processor of claim 9, wherein said means for processing the pixels in said mask buffer corresponding to the interior of said triangles implements the following table:

| ORIENT | MB_OLD | MB_NEW |
|--------|--------|--------|
| '+' | '+' | '+' |
| '+' | '−' | '0' |
| '+' | '0' | '+' |
| '+' | 'e' | 'e' |
| '−' | '+' | '0' |
| '−' | '−' | '−' |
| '−' | '0' | '−' |
| '−' | 'e' | 'e' | wherein:
'+'=a fill pixel of counterclockwise triangle orientation
'−'=a fill pixel of a clockwise triangle
'0'=a cleared pixel
'e'=an edge pixel
MB_OLD=old mask buffer value at X,Y address
MB_NEW=new mask buffer value at X,Y address.

11. The display processor of claim 10, wherein said second combinational logic means asserts said fill signal when a valid X,Y address signal is received from said generation means and the content of said mask buffer at said X,Y address is '+' or '−', and asserts said edge signal when a valid X,Y address signal is received from said generation means and the content of the mask buffer at said X,Y address is 'e'.

12. The display processor of claim 8, wherein said edge/triangle generation means includes means for generating an address sequence of all points on an edge of the polygon, and wherein said first combinational logic means writes an edge value, 'e', at those locations in the mask buffer corresponding to valid X,Y edge addresses, said addresses being received from said edge triangle generation means.

13. A display processor for a computer graphics display system having display means including a frame buffer for storing individual pixels for each of a plurality of lines to be displayed on a display monitor, said frame buffer being organized into an M×N plurality of addressable constituent blocks of pixels, said display processor being capable of drawing in said frame buffer a concave polygon, said display processor comprising:
   a controller;
   an X-Y generator;
   interpolating means configured to receive signals from said controller and said X-Y generator and output interpolated values of Z and intensity for each X,Y address;
   mask buffer and depth buffer means including a mask buffer having an M×N plurality of addressable constituent pixels, each pixel being two bits deep, and a depth buffer organized into an M×N plurality of addressable constituent blocks of pixels, said mask buffer and depth buffer means outputting to the frame buffer interpolated values of Z for each X,Y address corresponding to the boundary and interior of said concave polygon; and
   said mask buffer and depth buffer means including combinational logic for generating an accurate mask of said polygon in said mask buffer, said mask being used to control drawing to said frame buffer of said intensity values and storing in said depth buffer interpolated values of Z for each X,Y address.

14. The display processor of claim 13, further including a line style generator disposed between said X-Y generator and said mask buffer and depth buffer means, said line style generator defining for said mask buffer and depth buffer means edge gap pixels and edge segment pixels representative of a styled polygon boundary.

15. In a computer graphics display system having a display processor and display means including a frame buffer for storing individual pixels for each of a plurality of lines to be displayed on a display monitor, said frame buffer being organized into an M×N plurality of addressable constituent blocks of pixels, an improved method of drawing a concave polygon in said frame buffer, said method using a mask buffer organized into an M×N plurality of addressable constituent pixels, said method comprising the steps of:
   (a) masking the pixels in said mask buffer corresponding to the boundary of said polygon and drawing the pixels in said frame buffer corresponding to the boundary of said polygon;
   (b) tessellating said polygon into a set of triangles;
   (c) masking the pixels in said mask buffer corresponding to the interior of each of said triangles while preserving the masked pixels in said mask buffer corresponding to said polygon boundary; and
   (d) drawing the pixels in said frame buffer corresponding to the interior of each of said triangles with reference to the masked interior pixels in said mask buffer.

16. The method of claim 15, wherein said concave polygon comprises a polygon with a polygonal hole, and said method further includes:

tessellating the polygonal hole into a set of triangles definitive of the polygonal hole, each of said triangles being represented by a set of vertices, said vertex sets each starting from the same polygon vertex;

and wherein said interior pixel masking step (c) includes:

processing the pixels in said mask buffer corresponding to the interior of each of said concave polygon definitive triangles and said polygonal hole definitive triangles such that pixels within overlapping polygon triangles and polygonal hole definitive triangles are unmasked.

17. The method of claim 15, wherein each of said triangles has an interior bounded by the edges of the triangle and is represented by an ordered set of vertices, adjacent pairs of triangles having a region of overlap along their common edge, said triangles having a common first vertex, each of said triangles having a positive or negative orientation in accordance with the sign of the cross product of a first vector extending between the first and second vertices of said triangle and a second vector extending between the first and third vertices of said triangle;

and wherein said interior pixel masking step (c) includes:

determining the orientation of each of said triangles; and processing the pixels in said mask buffer corresponding to the interior of each triangle such that the interior pixels of adjacent triangles of the same orientation are masked while interior pixels of adjacent triangles of different orientation are unmasked within the triangles' region of overlap.

18. In a computer graphics display system having a display processor and display means including a frame buffer for storing individual pixels for each of a plurality of lines to be displayed on a display monitor, said frame buffer being organized into an $M \times N$ plurality of addressable constituent blocks of pixels, an improved method for drawing a concave polygon in said frame buffer, said method using a mask buffer organized into an $M \times N$ plurality of addressable constituent pixels, said method comprising the steps of:

tessellating said polygon into a set of triangles using a triangle generator;

masking the pixels in said mask buffer corresponding to the boundary of said polygon;

masking the pixels in said mask buffer corresponding to the interior of said polygon using said set of triangles, said masking the pixels in said mask buffer corresponding to the interior of said polygon being performed while preserving the masked pixels in said mask buffer corresponding to said polygon boundary; and drawing the pixels in said frame buffer corresponding to the interior of each of said triangles with reference to the masked interior pixels in said mask buffer.

19. In a computer graphics display system having a display processor and a display means including a frame buffer for storing individual pixels for each of a plurality of lines to be displayed on a display monitor, said frame buffer being organized into an $M \times N$ plurality of addressable constituent blocks of pixels, and further including a depth buffer for storing Z values for individual pixels, said depth buffer being organized into an $M \times N$ plurality of addressable constituent blocks of pixels, an improved method for drawing a concave polygon in said frame buffer, said method using a mask buffer organized into an $M \times N$ plurality of addressable constituent pixels, said method comprising the steps of:

(a) masking the pixels in said mask buffer corresponding to the boundary of said polygon, storing Z values of pixels in said depth buffer corresponding to the boundary of said polygon, and drawing the pixels in said frame buffer corresponding to the boundary of said polygon;

(b) masking the pixels in said mask buffer corresponding to the interior or said polygon while preserving the masked pixels in said mask buffer corresponding to said polygon boundary; and (c) storing Z values of pixels in said depth buffer corresponding to the interior of said polygon with reference to the masked polygon interior pixels of said mask buffer and drawing the pixels in said frame buffer corresponding to the interior of said polygon with reference to the masked polygon interior pixels of said mask buffer.

20. The method of claim 19, wherein said method further includes:

tessellating the polygon into a set of triangles, each of said triangles having an interior bounded by the edges of the triangle, adjacent pairs of triangles having a region of overlap along their common edge, each of said triangles being represented by an ordered set of vertices, said triangles having a common first vertex, each of said triangles having a positive or negative orientation in accordance with the sign of the cross product of a first vector extending between the first and second vertices of said triangle and a second vector extending between the first and third vertices of said triangle;

and wherein said interior pixel masking step (b) includes:

determining the orientation of each of said triangles; and processing the pixels in said mask buffer corresponding to the interior of each triangle such that interior pixels of adjacent triangles of the same orientation are masked while interior pixels of adjacent triangles of different orientation are unmasked within the triangles' region of overlap.

21. The method of claim 19, wherein said boundary pixel masking in the mask buffer, said boundary pixel drawing in the frame buffer and said boundary pixel Z value storing in the depth buffer occur substantially simultaneously.

22. The method of claim 19, wherein said interior pixel drawing in the frame buffer and said Z value storing in the depth buffer occur substantially simultaneously.

23. In a computer graphics display system having a display processor and a display means including a frame buffer for storing individual pixels for each of a plurality of lines to be displayed on a display monitor, said frame buffer being organized into an $M \times N$ plurality of addressable constituent blocks of pixels, a method for drawing a concave polygon in said frame buffer, said polygon comprising a clipped polygon having at least one sub-area within a Z-fake front or back edge generated from clipping the polygon against a front or back Z-axis clipping plane, each sub-area being defined by a respective set of vertices, and each of said Z-fake edges being defined by a subset of vertices from the set of vertices defining the corresponding sub-area, said method using a mask buffer organized into an M×N plurality of addressable constituent pixels, said method comprising the steps of:

(a) masking the pixels in each mask buffer corresponding to the boundary of said polygon and drawing the pixels in said frame buffer corresponding to the boundary of said polygon, said boundary masking including, (i) saving the vertices defining each Z-fake edge of the polygon in one of two lists, a first list containing vertices of Z-fake back edges and a second list containing vertices of Z-fake front edges, (ii) sorting each non-empty first and second list based on X-axis vertex values if the slope of said Z-fake edge is closer to a horizontal slope than a vertical slope and based on Y-axis vertex values if the slope of said Z-fake edge is closer to a vertical slope than a horizontal slope, and (iii) masking Z-fake edges in said mask buffer by generating edge segments between successive pairs of sorted vertices for each non-empty list;

(b) masking the pixels in said mask buffer corresponding to the interior of said polygon while preserving the masked pixels in said mask buffer corresponding to said polygon boundary; and (c) drawing the pixels in said frame buffer corresponding to the interior of said polygon with reference to the masked polygon interior pixels in said mask buffer.

24. The method of claim 23, wherein said interior masking step (b) and said interior drawing step (c) for each sub-area include the step of:

modifying the set of vertices defining said sub-area by adding to the subset of vertices defining each Z-fake edge any vertices of other sub-areas lying along said edge and located between the Z-fake edge definitive vertices of said sub-area.

25. In a computer graphics display system having a display processor and display means including a frame buffer for storing individual pixels for each of a plurality of lines to be displayed on the display monitor, said frame buffer being organized into M×N plurality of addressable constituent blocks of pixels, an improved method for drawing a concave polygon in said frame buffer, said method using a mask buffer organized into an M×N plurality of addressable constituent pixels, said method comprising the steps of:

tessellating said polygon into a set of triangles using a triangle generator, each of said triangles of said set of triangles having an interior bounded by the edges of the triangle and being represented by an ordered set of vertices, adjacent pairs of triangles having a region of overlap along their common edge, said triangles having a common first vertex, each of said triangles having a positive or negative orientation in accordance with the sign of the cross product of a first vector extending between the first and second vertices of said triangle and a second vector extending between the first and third vertices of said triangle;

masking the pixels in said mask buffer corresponding to the interior of said polygon using said set of triangles, said interior pixel masking including (i) determining the orientation of each of said triangles, (ii) processing the pixels in said mask buffer corresponding to the interior of each triangle such that the interior pixels of adjacent triangles of the same orientation are masked while interior pixels of adjacent triangles of different orientation are unmasked within the triangles' region of overlap; and drawing the pixels in said frame buffer corresponding to the interior of each of said triangles with reference to the masked interior pixels in said mask buffer.

* * * * *